US 8,482,749 B2

(12) United States Patent
Ishigure

(10) Patent No.: US 8,482,749 B2
(45) Date of Patent: Jul. 9, 2013

(54) IMAGE PROCESSING APPARATUS AND METHOD FOR PERFORMING OPERATION FOR IMAGE INFORMATION

(75) Inventor: Tsuyoshi Ishigure, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/546,354

(22) Filed: Jul. 11, 2012

(65) Prior Publication Data
US 2012/0274960 A1 Nov. 1, 2012

Related U.S. Application Data

(63) Continuation of application No. 12/588,624, filed on Oct. 22, 2009, now Pat. No. 8,243,296.

(30) Foreign Application Priority Data

Nov. 28, 2008 (JP) ................................. 2008-303613

(51) Int. Cl.
*G06F 15/00* (2006.01)
*G06F 3/12* (2006.01)
*G06K 1/00* (2006.01)
*G06K 15/00* (2006.01)

(52) U.S. Cl.
USPC ........................................ 358/1.13; 358/1.14

(58) Field of Classification Search
None
See application file for complete search history.

(56) References Cited

U.S. PATENT DOCUMENTS

| 8,023,853 | B2 | 9/2011 | Suzuki | |
|---|---|---|---|---|
| 2003/0030664 | A1 | 2/2003 | Parry | |
| 2008/0174818 | A1* | 7/2008 | Kanamoto | 358/1.15 |
| 2009/0067757 | A1* | 3/2009 | Lee | 382/311 |

FOREIGN PATENT DOCUMENTS

| JP | A-2002-169680 | 6/2002 |
|---|---|---|
| JP | A-2005-158038 | 6/2005 |
| JP | A-2005-184198 | 7/2005 |
| JP | A-2006-031465 | 2/2006 |
| JP | A-2008-162068 | 7/2008 |

* cited by examiner

*Primary Examiner* — Douglas Tran
(74) *Attorney, Agent, or Firm* — Posz Law Group, PLC

(57) ABSTRACT

An image processing apparatus includes: an operation section by which a user selects image information and that is configured to perform an operation for the selected image information; a determination section configured to determine a display item to be displayed by the operation section based on attribute information that corresponds to the selected image information; and an operation control section configured to change the displayed item to be displayed by the operation section based on a determination result by the determination section. A method for performing an operation for image information includes: displaying a plurality of sets of image information so as to allow a user to select predetermined image information; determining a display item to be displayed, based on attribute information that corresponds to the selected image information; and changing the displayed item to be displayed, based on a determination result.

28 Claims, 25 Drawing Sheets

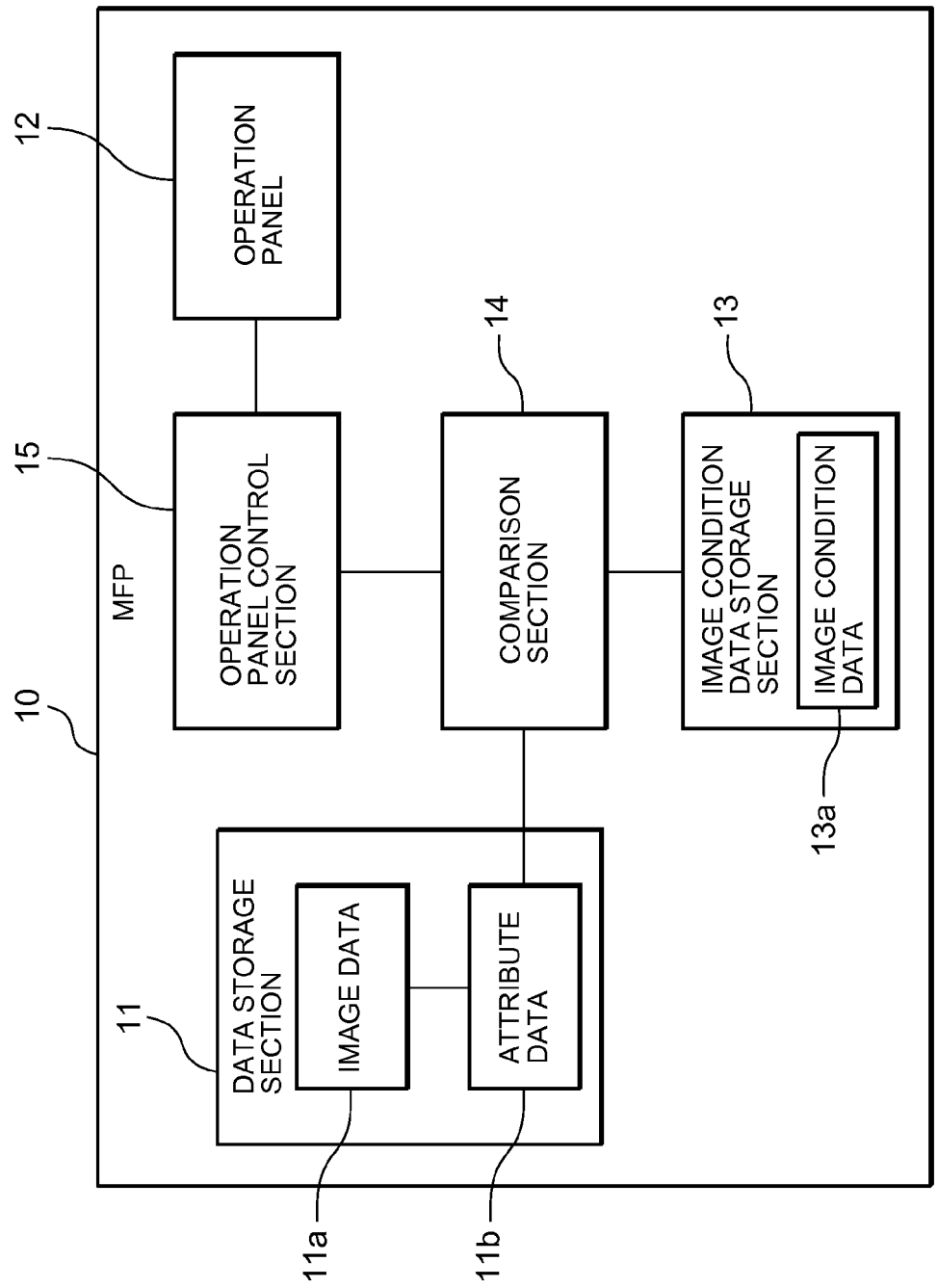

| ATTRIBUTE ITEM | VALUE |
|---|---|
| CREATED DATE AND TIME | 2008.7.1  12:00:00 |
| CREATOR NAME | TARO OKI |
| HOST IDENTIFIER (IP ADDRESS) | 12.34.56.78 |
| EXPIRATION DATE AND TIME | 2008.7.8  12:00:00 |
| AVERAGE DENSITY | 128 |
| MONOCHROME/COLOR MODE | COLOR |
| RESOLUTION | 150 dpi |
| NUMBER OF PRINTS | 0 |
| NUMBER OF ALLOWED PRINTS | 2 |
| NUMBER OF FAX TRANSMISSIONS | 0 |
| NUMBER OF ALLOWED FAX TRANSMISSIONS | 1 |
| FAX SENDER NAME | – |
| FAX RECEIVER NAME | – |
| READ-ONLY DESIGNATION | NO |
| NUMBER OF PAGES | 10 |

FIG. 11

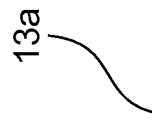

| PROCESS | IMAGE CONDITION |
|---|---|
| PRINT | [NUMBER OF ALLOWED PRINTS]>[NUMBER OF PRINTS] |
| PRINT | [RESOLUTION]≧300 dpi |
| PRINT | [EXPIRATION DATE AND TIME]≧CURRENT DATE AND TIME |
| E-MAIL TRANSMISSION | [EXPIRATION DATE AND TIME]≧CURRENT DATE AND TIME |
| FAX TRANSMISSION | [NUMBER OF ALLOWED FAX TRANSMISSIONS]>[NUMBER OF FAX TRANSMISSIONS] |
| FAX TRANSMISSION | [EXPIRATION DATE AND TIME]≧CURRENT DATE AND TIME |
| DUPLEX PRINT | [NUMBER OF PAGES]≧1 |
| COLOR COPY | [MONOCHROME/COLOR MODE] = COLOR |
| COLOR SCAN | [MONOCHROME/COLOR MODE] = COLOR |

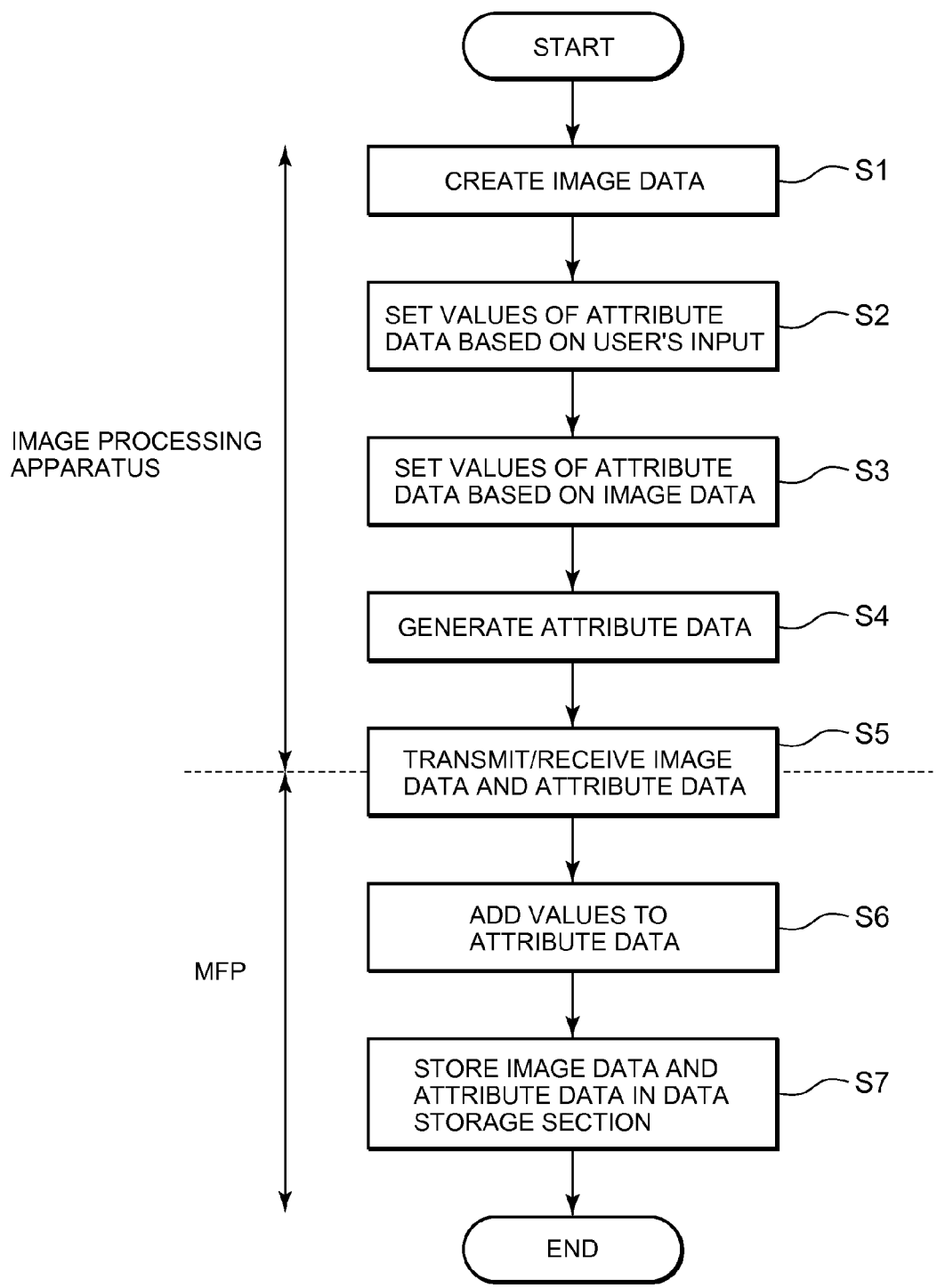

FIG. 19

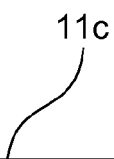

| ATTRIBUTE ITEM | VALUE |
| --- | --- |
| CREATED DATE AND TIME | 2008.7.1 12:00:00 |
| CREATOR NAME | TARO OKI |
| HOST IDENTIFIER (IP ADDRESS) | 12.34.56.78 |
| EXPIRATION DATE AND TIME | 2008.7.8 12:00:00 |
| AVERAGE DENSITY | 128 |
| MONOCHROME/COLOR MODE | COLOR |
| RESOLUTION | 150 dpi |
| NUMBER OF PRINTS | 0 |
| NUMBER OF ALLOWED PRINTS | 2 |
| NUMBER OF FAX TRANSMISSIONS | 0 |
| NUMBER OF ALLOWED FAX TRANSMISSIONS | 1 |
| FAX SENDER NAME | – |
| FAX RECEIVER NAME | – |
| READ-ONLY DESIGNATION | NO |
| NUMBER OF PAGES | 10 |
| PRESENCE OF AUTHENTICATION INFORMATION | YES |
| AUTHENTICATION INFORMATION | 1234 |

IMAGE PROCESSING APPARATUS AND METHOD FOR PERFORMING OPERATION FOR IMAGE INFORMATION

CROSS-REFERENCE TO RELATED APPLICATION

This application is a continuation application of U.S. patent application Ser. No. 12/588,624 filed on Oct. 22, 2009, entitled "IMAGE FORMING APPARATUS AND IMAGE FORMING METHOD", which claims priority based on 35 USC 119 from prior Japanese Patent Application No. 2008-303613 filed on Nov. 28, 2008, the entire contents of both of which are incorporated herein by reference.

BACKGROUND

This application relates to an image processing apparatus, and more particularly, to an image processing apparatus that displays various image information for user selection and that performs an operation for image information based on the user selection. Moreover, the application also relates to a method for performing the operation for image information.

An image forming apparatus such as a multifunction peripheral (hereinafter, referred to as "MFP") is capable of storing image data in a storage medium such as a hard disk incorporated in the apparatus. A user can use the image data stored in the storage medium for various purposes. Japanese Patent Laid-Open No. 2008-162068 discloses one such image forming apparatus.

In the aforementioned image forming apparatus, however, the attribute of the image data is not necessarily suitable for process conditions the user needs. Therefore, the processing results of the image data frequently do not correspond to the needs of the user. In the case of printing the image data, resources such as print sheets and toner are wasted.

SUMMARY

An object of the application is to disclose an image processing apparatus and a method for performing the operation for image information.

According to one aspect, an image processing apparatus includes: an operation section by which a user selects image information and that is configured to perform an operation for the selected image information; a determination section configured to determine a display item to be displayed by the operation section based on attribute information that corresponds to the selected image information; and an operation control section configured to change the displayed item to be displayed by the operation section based on a determination result by the determination section.

According to another aspect, a method for performing an operation for image information includes: displaying a plurality of sets of image information so as to allow a user to select predetermined image information; determining a display item to be displayed, based on attribute information that corresponds to the selected image information; and changing the displayed item to be displayed, based on a determination result.

The full scope of applicability of the image processing apparatus and the method for performing an operation for image information will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The image processing apparatus and the method for performing an operation for image information will become more fully understood from the detailed description given herein and the accompanying drawings, which are given by way of illustration only, and thus do not limit the invention, and wherein:

FIG. 2 is a block diagram of the MFP of the first embodiment;

FIG. 3 is a data structure diagram of attribute data of the first embodiment;

FIG. 11 is a data structure diagram of image condition data of the first embodiment;

FIG. 12 is a flow chart of the procedures for generating image data and the attribute data, and for storing them in a data storage section;

FIG. 19 is a data structure diagram of attribute data of the second embodiment;

DETAILED DESCRIPTION

Preferred embodiments of an image processing apparatus and a method for performing an operation for image information according to the invention will be described in detail with reference to the accompanying drawings. In each embodiment, the description will be given with an MFP as an image forming apparatus.

First Embodiment

Figure 1:
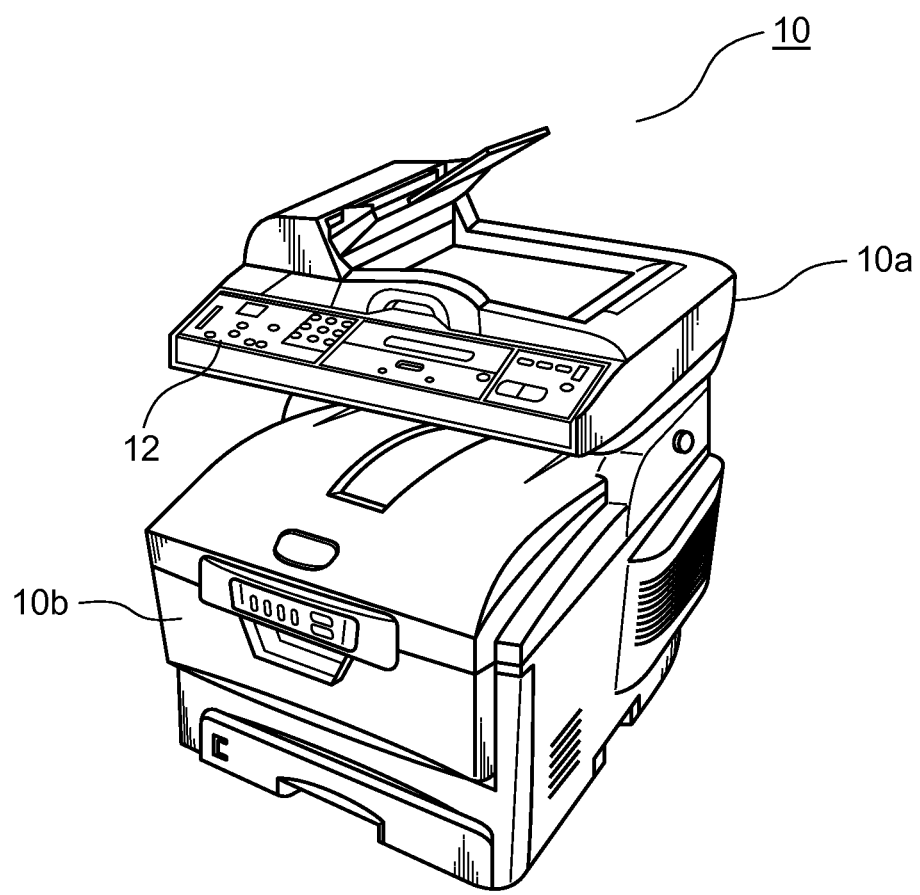
FIG. 1 is a schematic view of an MFP of a first embodiment.

FIG. 1 is a schematic view of an MFP 10 according to a first embodiment, which may include a scanner 10a and a printer 10b. The scanner 10a that has an operation panel 12 is provided above the printer 10b.

FIG. 2 is a block diagram of the MFP 10, which may include a data storage section 11, an operation panel, or operation section, 12, an image condition data storage section 13, a comparison section 14 and an operation panel control section 15. The data storage section 11, or an information storage section, stores image data 11a, or image information, and attribute data 11b, or attribute information. The attribute data 11b corresponds to the image data 11a. The image condition data storage section 13, or image condition information storage section, stores image condition data 13a, or image condition information. The comparison section 14 compares the attribute data 11b with the image condition data 13a. The operation panel control section 15, or an operation control section, controls the operation panel 12.

The MFP 10 is capable of performing various processes such as a printing process, a FAX transmission process and an e-mail transmission process, on the image data 11a stored in the data storage section 11 on the basis of a user's instructions. The image data 11a may be generated by an image processing apparatus connected with the MFP 10, for example, by a host computer (hereinafter, referred to as "host"). The image data 11a may also be generated by the scanner 10a or a FAX receiver of the MFP 10. The operation panel 12 serves as a user interface that receives the user's instructions, such as a selection instruction and a print instruction for the image data 11a stored in the data storage section 11.

FIG. 3 is a data structure diagram of the attribute data 11b, which includes attribute items of the image data 11a. The attribute items may include "CREATE DATE AND TIME," "CREATOR NAME," "HOST IDENTIFIER (e.g. IP ADDRESS)," "EXPIRATION DATE AND TIME," "AVERAGE DENSITY," "MONOCHROME/COLOR MODE," "RESOLUTION," "NUMBER OF PRINTS," "NUMBER OF ALLOWED PRINTS," "NUMBER OF FAX TRANSMISSIONS," "NUMBER OF ALLOWED FAX TRANSMISSIONS," "FAX SENDER NAME," "FAX RECEIVER NAME," "READ-ONLY DESIGNATION" and "NUMBER OF PAGES."

The attribute data 11b maybe generated by an apparatus that generates the image data 11a, for example, by the host (printer driver) or the MFP 10, when the image data 11a is generated. The attribute data 11b may also be generated by the MFP 10 when the MFP 10 stores the image data 11a in the data storage section 11. In some attribute items of the attribute data 11b, their values maybe updatable. For example, the value of the "NUMBER OF PRINTS" should be updated whenever corresponding image data 11a is printed. Specifically, the value of the "NUMBER OF PRINTS" is incremented by one for every print.

Next, various screens displayed on the operation panel 12 will be described with reference to FIGS. 4-10. The operation panel 12 may be a touch panel. On the operation panel 12, buttons a user can operate are respectively displayed as a rectangular box depicted by double solid lines. On the other hand, buttons the user cannot operate are respectively displayed as a rectangular box depicted by double dashed lines.

Figure 4:
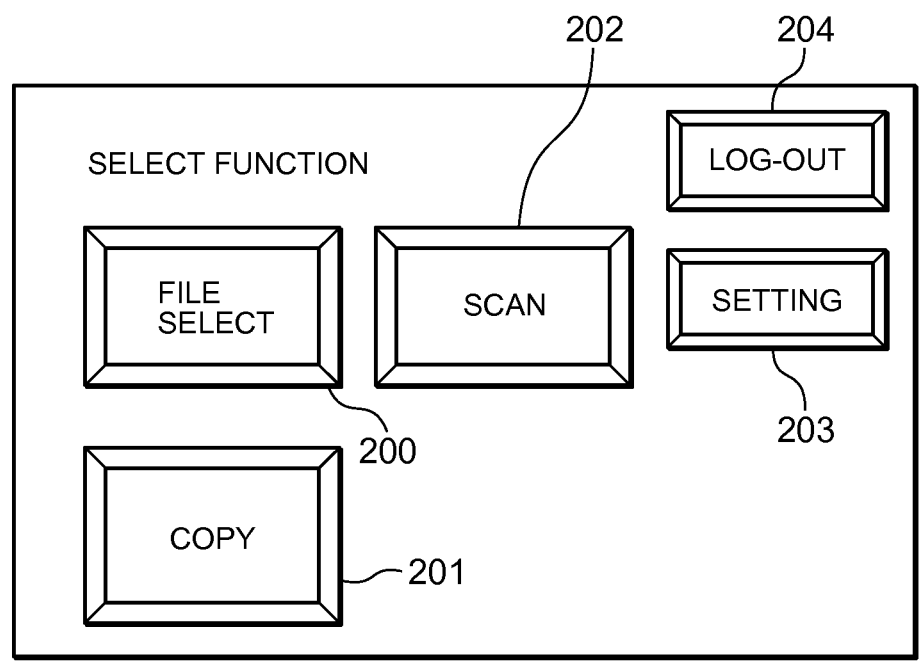
FIG. 4 is a screen view of a function selection screen displayed on an operation panel of the first embodiment.

FIG. 4 is a screen view of a function selection screen displayed on the operation panel 12. The function selection screen is displayed on the operation panel 12 immediately after logging into the MFP 10. The function selection screen may display a file selection button 200, a copy button 201, a scan button 202, a setting button 203 and a log-out button 204. These buttons function as instruction sections through which the user instructs the MFP 10 to perform predetermined processes. By touching or holding down a corresponding button, the user can select any one of the various functions such as, for example, selecting the image data 11a stored in the data storage section 11, copying documents, scanning documents, setting the MFP 10 and logging out of the MFP 10.

Figure 5:
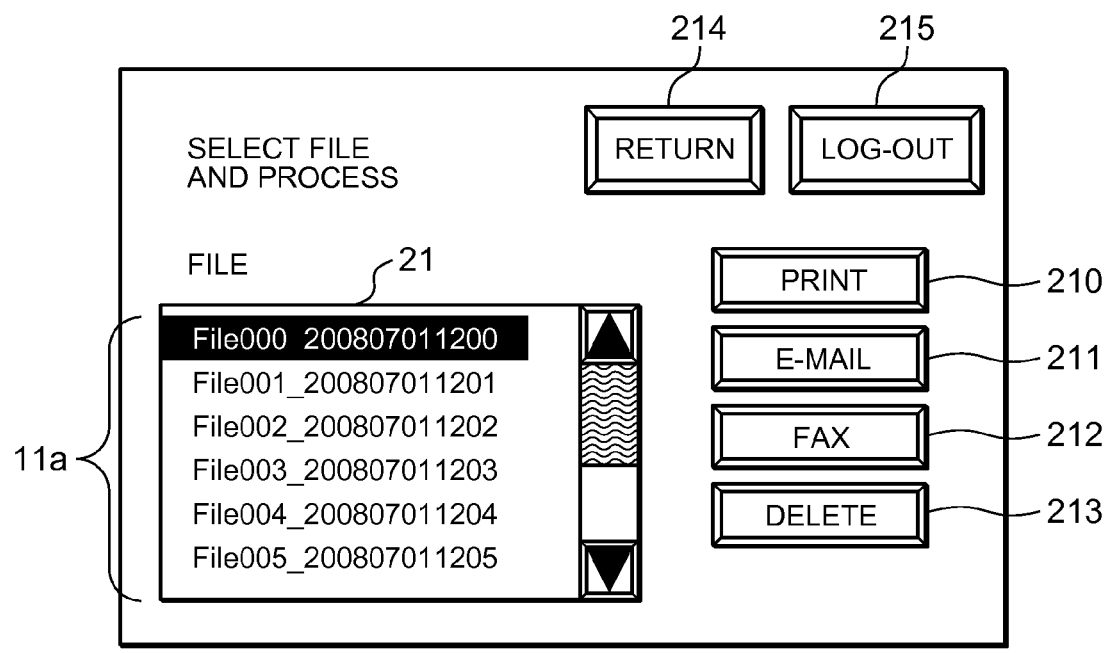
FIG. 5 is a screen view of a file selection screen displayed on the operation panel of the first embodiment.

FIG. 5 is a screen view of a file selection screen displayed on the operation panel 12. The file selection screen is displayed on the operation panel 12 when the user touches the file selection button 200 shown in FIG. 4. The file selection screen displays a list 21 of the image data 11a stored in the data storage section 11 and various buttons through which the user instructs the MFP 10 to perform predetermined processes on the image data 11a selected by the user.

The various buttons, or instruction sections, may include a print button 210, an e-mail transmission button 211, a FAX transmission button 212 and a delete button 213. The print button 210 is used for instructing the execution of a printing process on the image data 11a. The e-mail transmission button 211 is used for instructing the execution of an e-mail transmission process that sends an e-mail with the image data 11a. The FAX transmission button 212 is used for instructing the execution of a FAX transmission process that faxes the image data 11a. The delete button 213 is used for instructing the execution of a delete process that deletes the image data 11a from the data storage section 11. When the user touches any one of these buttons, another screen corresponding to the button is displayed on the operation panel 12. In addition, the file selection screen displays a return button 214 for returning to the function selection screen shown in FIG. 4 and a log-out button 215 for logging out of the MFP 10.

Figure 6:
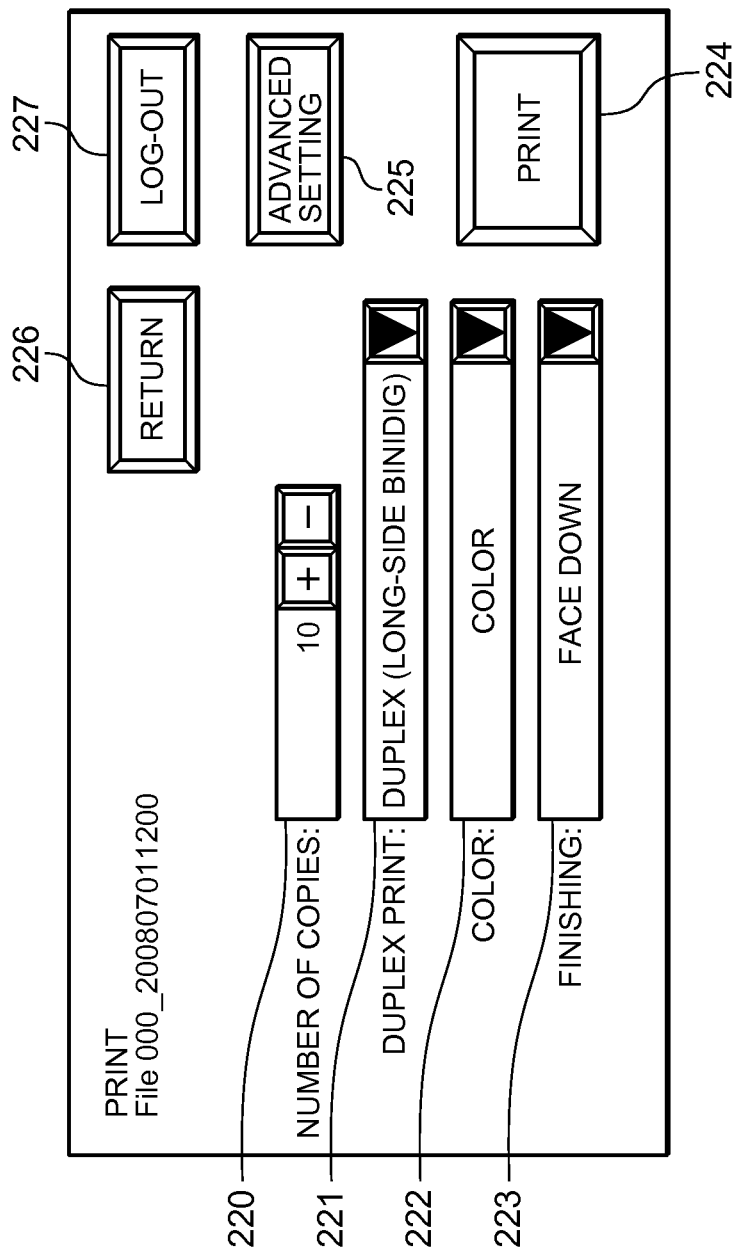
FIG. 6 is a screen view of a file print setting screen displayed on the operation panel of the first embodiment.

FIG. 6 is a screen view of a file print setting screen displayed on the operation panel 12. The file print setting screen is displayed on the operation panel 12 when the user touches the print button 210 shown in FIG. 5. The file print setting screen may display a number-of-copies setting button 220, a duplex print setting button 221, a color setting button 222, a finishing setting button 233 and an advanced setting button 225, which are used for setting conditions for printing the image data 11a. In addition, the file print setting screen displays a print button 224 for instructing the execution of the printing process on the image data 11a, a return button 226 for returning to the file selection screen shown in FIG. 5 and a log-out button 227 for logging out of the MFP 10. These buttons function as instruction sections through which the user instructs the MFP 10 to perform predetermined processes.

Figure 7:
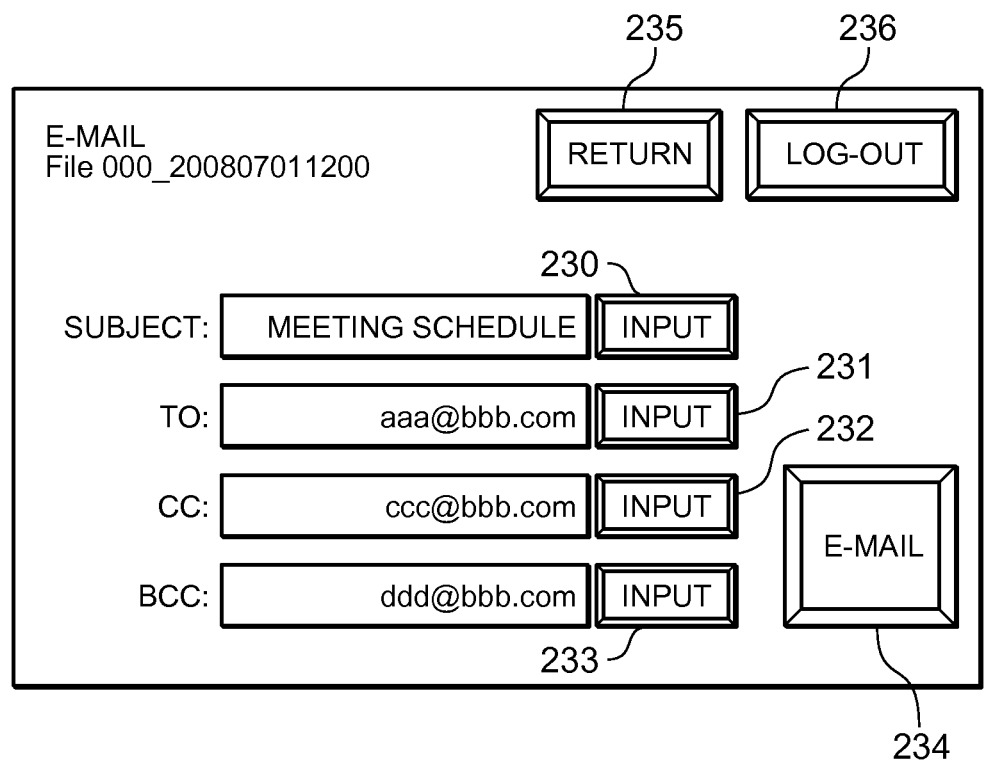
FIG. 7 is a screen view of a file e-mail transmission setting screen displayed on the operation panel of the first embodiment.

FIG. 7 is a screen view of a file e-mail transmission setting screen displayed on the operation panel 12. The file e-mail transmission setting screen is displayed on the operation panel 12 when the user touches the e-mail transmission button 211 shown in FIG. 5. The file e-mail transmission setting screen may display a subject input button 230, a "TO" address input button 231, a "CC" address input button 232 and a "BCC" address input button 233, which are used for setting conditions for e-mail transmission of the image data 11*a*. When the user touches these input buttons 230-233, input screens, not shown, appear on the operation panel 12. The user can input a subject and addresses on the input screens. In addition, the file e-mail transmission setting screen displays an e-mail transmission button 234 for instructing the execution of the e-mail transmission process that sends an e-mail with the image data 11*a* to designated addresses, a return button 235 for returning to the file selection screen shown in FIG. 5 and a log-out button 226 for logging out of the MFP 10. These buttons function as instruction sections through which the user instructs the MFP 10 to perform predetermined processes.

Figure 8:
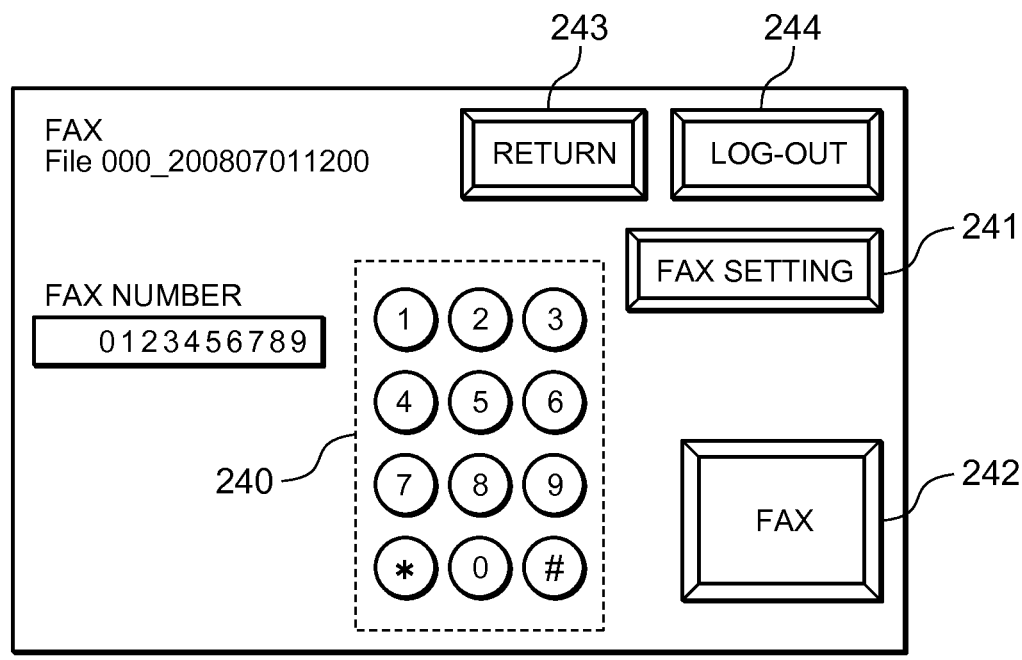
FIG. 8 is a screen view of a file FAX transmission setting screen displayed on the operation panel of the first embodiment.

FIG. 8 is a screen view of a file FAX transmission setting screen displayed on the operation panel 12. The file FAX transmission setting screen is displayed on the operation panel 12 when the user touches the FAX transmission button 212 shown in FIG. 5. The file FAX transmission setting screen may display numeric keypad buttons 240, a FAX transmission setting button 241 and a FAX transmission button 242, which are used for setting conditions for FAX transmission of the image data 11*a*. The numeric keypad buttons 240 are used for inputting a phone number that is a destination of the FAX. The FAX transmission setting button 241 is used for setting a FAX transmission mode. The FAX transmission button 242 is used for instructing the execution of the FAX transmission process. In addition, the file FAX transmission setting screen displays a return button 243 for returning to the file selection screen shown in FIG. 5 and a log-out button 244 for logging out of the MFP 10. These buttons function as instruction sections through which the user instructs the MFP 10 to perform predetermined processes.

Figure 9:
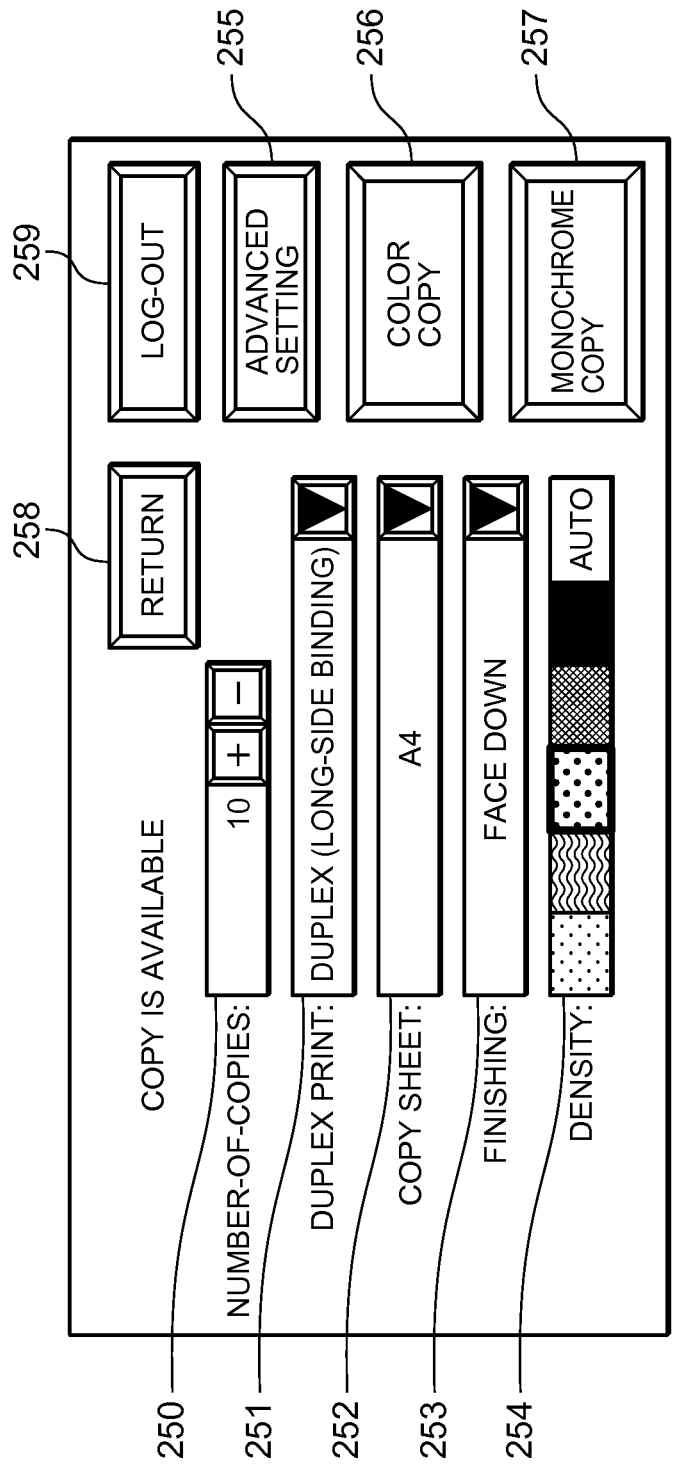
FIG. 9 is a screen view of a copy setting screen displayed on the operation panel of the first embodiment.

FIG. 9 is a screen view of a copy setting screen displayed on the operation panel 12. The copy setting screen is displayed on the operation panel 12 when the user touches the copy button 201 shown in FIG. 4. The copy setting screen may display a number-of-copies setting button 250, a duplex print setting button 251, a copy sheet setting button 252, a finishing setting button 253, a density setting button 254 and an advanced setting button 255, which are used for setting conditions for copying documents. In addition, the copy setting screen displays a color copy button 256 for instructing the execution of a color copy process, a monochrome copy button 257 for instructing the execution of a monochrome copy process, a return button 258 for returning to the function selection screen shown in FIG. 4 and a log-out button 259 for logging out of the MFP 10. These buttons function as instruction sections through which the user instructs the MFP 10 to perform predetermined processes.

Figure 10:
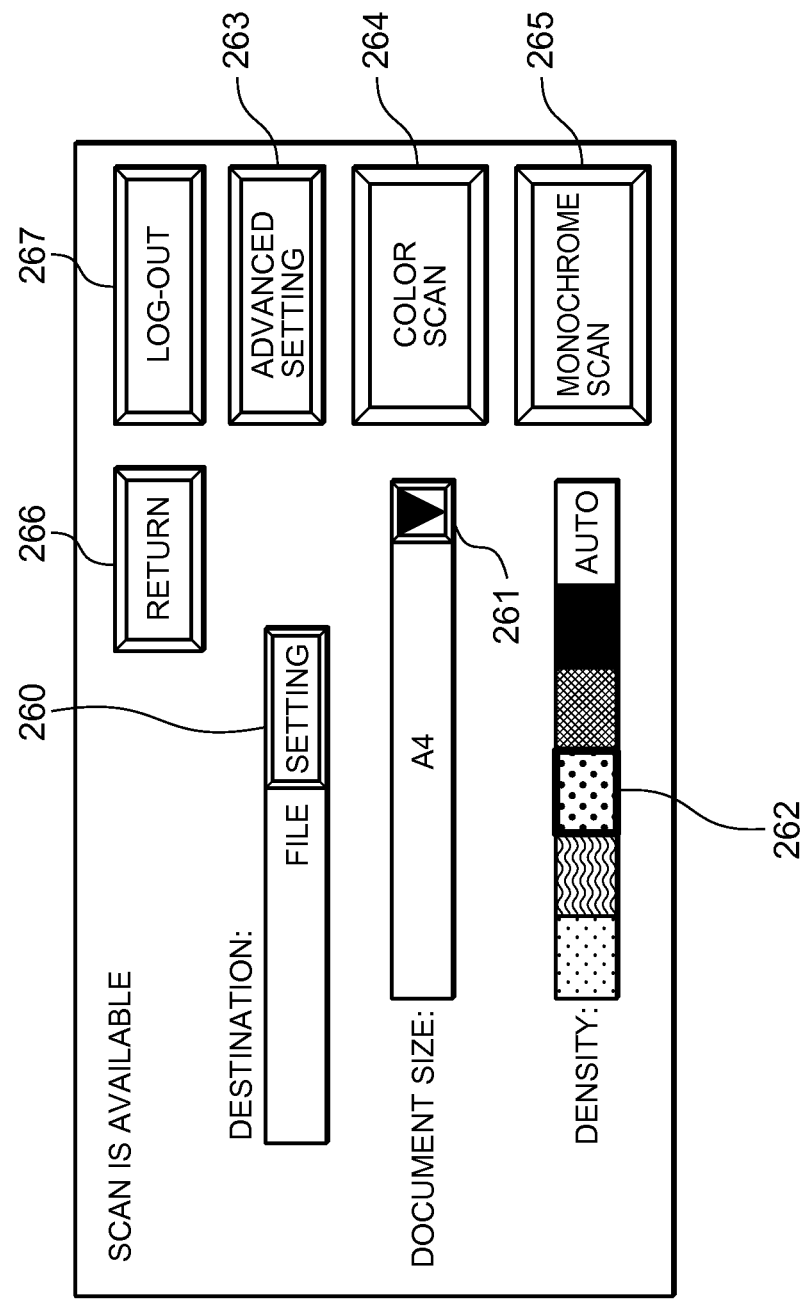
FIG. 10 is a screen view of a scan setting screen displayed on the operation panel of the first embodiment.

FIG. 10 is a screen view of a scan setting screen displayed on the operation panel 12. The scan setting screen is displayed on the operation panel 12 when the user touches the scan button 202 shown in FIG. 4. The scan setting screen may display a destination setting button 260, a document size setting button 261, a scan density setting button 262 an advanced setting button 263, which are used for setting conditions for scanning a document. In addition, the scan setting screen displays a color scan button 264 for instructing the execution of a color scanning process, a monochrome scan button 265 for instructing the execution of a monochrome scanning process, a return button 266 for returning to the function selection screen shown in FIG. 4 and a log-out button 267 for logging out of the MFP 10. These buttons function as instruction sections through which the user instructs the MFP 10 to perform predetermined processes. By touching the destination setting button 260, the user can designate a destination of the image data 11*a* of the document to save or to transmit. The destination of the image data 11*a* to save may be the data storage section 11 of the MFP 10. The destination of the image data 11*a* to transmit may be selected from FAX transmission, e-mail transmission and an image processing apparatus (not shown).

The image condition data storage section 13 has stored therein the image condition data 13*a* that defines image conditions that the attribute of the image data 11*a* should satisfy when a predetermined process, for example, a printing process, is performed on the image data 11*a*. The image conditions are defined individually for each process. If the attribute of the image data 11*a* does not satisfy the image conditions, the button for instructing the execution of the process is not displayed or is not operable on the operation panel 12.

FIG. 11 is a data structure diagram of the image condition data 13*a*, which includes process information on the image data 11*a* and image condition information corresponding to the process information. The image condition information defines image conditions the attribute of the image data 11*a* should satisfy when each process is performed. In FIG. 11, items shown in brackets ([ ]) correspond to items of the attribute data 11*b* shown in FIG. 3.

Referring to FIG. 11, for example, in the case of printing the image data 11*a*, the attribute of the image data 11*a* should satisfy the following image conditions (1) to (3).

(1) The "NUMBER OF PRINTS" in the attribute data 11*b* is less than the "NUMBER OF ALLOWED PRINTS" in the attribute data 11*b*.

(2) The "RESOLUTION" in the attribute data 11*b* is higher than or equal to 300 dpi.

(3) The current date and time has not reached the "EXPIRATION DATE AND TIME" in the attribute data 11*b*.

The attribute of the image data 11*a* should satisfy all the image conditions (1) to (3).

Each of the image conditions in the image condition data 13*a* maybe fixed for the MFP 10. Moreover, each of the image conditions maybe selectable among multiple conditions. For example, each of the image conditions may be different from each user so that different restrictions on the same process can be applied between individual users. More specifically, when the image condition regarding a color copy process in the image condition data 13*a* is set to "always reject" for a certain user, the color copy process instructed by the user is always restricted. The respective image conditions of the image condition data 13*a* may be changed by the user on the operation panel 12.

Referring to FIG. 2, the comparison section 14 compares the image condition data 13*a* stored in the image condition data storage section 13 with the attribute data 11*b* of the image data 11*a*, thereby determining whether or not a predetermined process included in the image condition data 13*a* is applicable to the image data 11*a*. The comparison section 14 starts its operation upon receiving the attribute data 11*b* and an instruction relating to the predetermined process from the operation panel control section 15. First, the comparison section 14 acquires the image condition data 13*a* from the image condition data storage section 13. Next, the comparison section 14 compares the image condition data 13*a* with the attribute data 11*b* to determine whether or not the process instructed by the user is executable. Subsequently, the comparison section 14 sends the comparison result to the operation panel control section 15.

The operation panel control section 15 controls the operation panel 12. The operation panel control section 15 receives instructions from the user through the operation panel 12 and controls the operation panel 12 to display a screen corresponding to the instructions. Moreover, the operation panel control section 15 reflects the comparison results, which is received from the comparison section 14, on the screen. The functions of the comparison section 14 and the operation panel control section 15 may be incorporated in the MFP 10 as programs. These programs are stored in a nonvolatile memory such as a read-only memory (ROM) or a flash memory, or a magnetic memory such as a hard disk.

The data storage section 11 and the image condition data storage section 13 may be incorporated in the MFP 10 as a volatile memory such as a random access memory (RAM), a nonvolatile memory such as a flash memory, or a magnetic memory such as a hard disk. Moreover, the data storage section 11 and the image condition data storage section 13 may also be provided as an external hard disk accessible from the MFP 10 or a storage medium in an image processing apparatus such as a host connected with the MFP 10 through a network.

In the first embodiment, the operation panel 12 is not limited to a touch panel. The operation panel 12 may be configured by a combination of a display and mechanical keys. In addition, attribute items of the attribute data 11b are not limited to the items shown in FIG. 11 as long as they are related to the image data 11a. Moreover, the image data 11a and the attribute data 11b are not necessarily individually stored in the data storage section 11. The attribute data 11b may be included in the image data 11a. Furthermore, the attribute data 11b is not necessarily stored in the data storage section 11. The attribute data 11b may be generated from the image data 11a on an as-needed basis, without being stored in the data storage section 11.

Next, the operation of the MFP 10 will be described.

First, the operation to generate and store the image data 11a and the attribute data 11b will be described with reference to FIG. 12. FIG. 12 is a flow chart of the procedures for generating the image data 11a and the attribute data 11b, and for storing them in the data storage section 11. Here, the description will be provided about the case where a user creates the image data 11a in an image processing apparatus such as a host, not shown, and sends it to the MFP 10.

At S1, the user creates the image data 11a in the image processing apparatus, by using an application program (hereinafter, referred to as "application") AP and a printer driver provided for the MFP 10.

At S2, the user inputs values for the attribute items of the attribute data 11b corresponding to the image data 11a created at S1. For example, the user inputs values for the "EXPIRATION DATE AND TIME" item, the "NUMBER OF ALLOWED PRINTS" item and the "NUMBER OF ALLOWED FAX TRANSMISSION" item, shown in FIG. 3.

At S3, the image processing apparatus sets values for the attribute items that are not input by the user at S2. For example, the image processing apparatus sets values for the "CREATE DATE AND TIME" item, the "CREATOR NAME" item and the "NUMBER OF PAGES" item, shown in FIG. 3. The value for the "CREATOR NAME" item, or a creator name, can be acquired from the login information on the image processing apparatus.

At S4, the image processing apparatus generates the attribute data 11b on the basis of the values for the attribute items that are provided at S2 and S3.

At S5, the image processing apparatus transmits the image data 11a created at S1 and the attribute data 11b generated at S4 to the MFP 10. The MFP 10 receives these data transmitted from the image processing apparatus.

At S6, the MFP 10 sets values for the rest of the attribute items of the attribute data 11b received at S5, which are neither input by the user at S2 nor set by the image processing apparatus at S3. For example, the MFP 10 sets a value for the "HOST IDENTIFIER (e.g. IP ADDRESS)" item shown in FIG. 3.

At S7, the MFP 10 stores the image data 11a received at S5 and the attribute data 11b altered at S6 in the data storage section 11 in relation to each other.

Through the above mentioned procedures, the image data 11a and the attribute data 11b are generated and stored in the data storage section 11 of the MFP 10.

The attribute data 11b is not necessarily generated in the image processing apparatus. The MFP 10 may generate the image data 11a and the attribute data 11b from data received via FAX and store them in data storage section 11. In the case of scanning or copying a document, the MFP 10 may generate the image data 11a and the attribute data 11b from scan data obtained by scanning preliminarily the document with the scanner 10a, and store them in data storage section 11. The image data 11a stored in the data storage section 11 may be updated by scanning preliminarily the document with the scanner 10a whenever a document cover of the scanner 10a is closed after opening.

Figure 13:
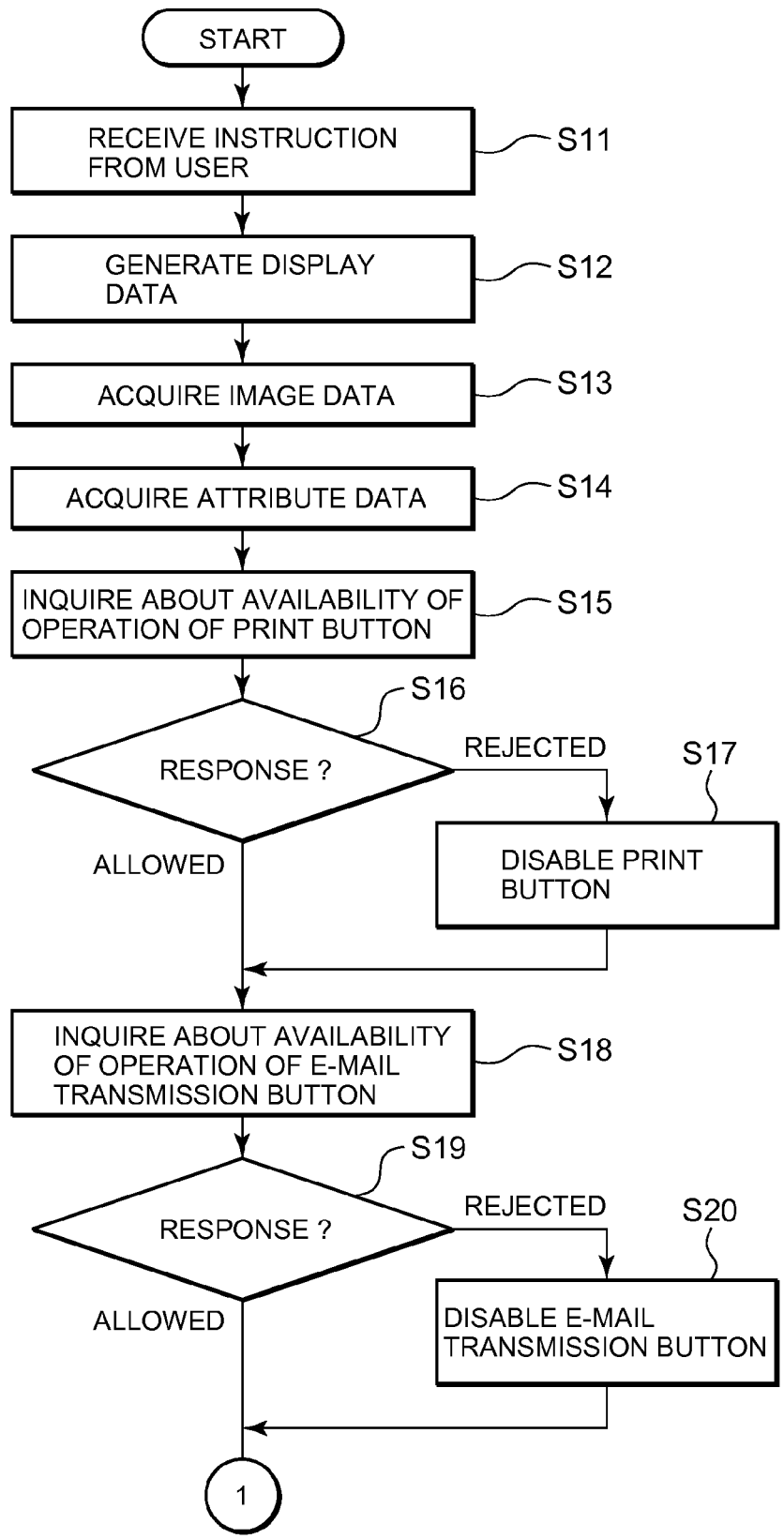
FIG. 13 is a first flow chart of an operation panel control section of the first embodiment.
Figure 14:
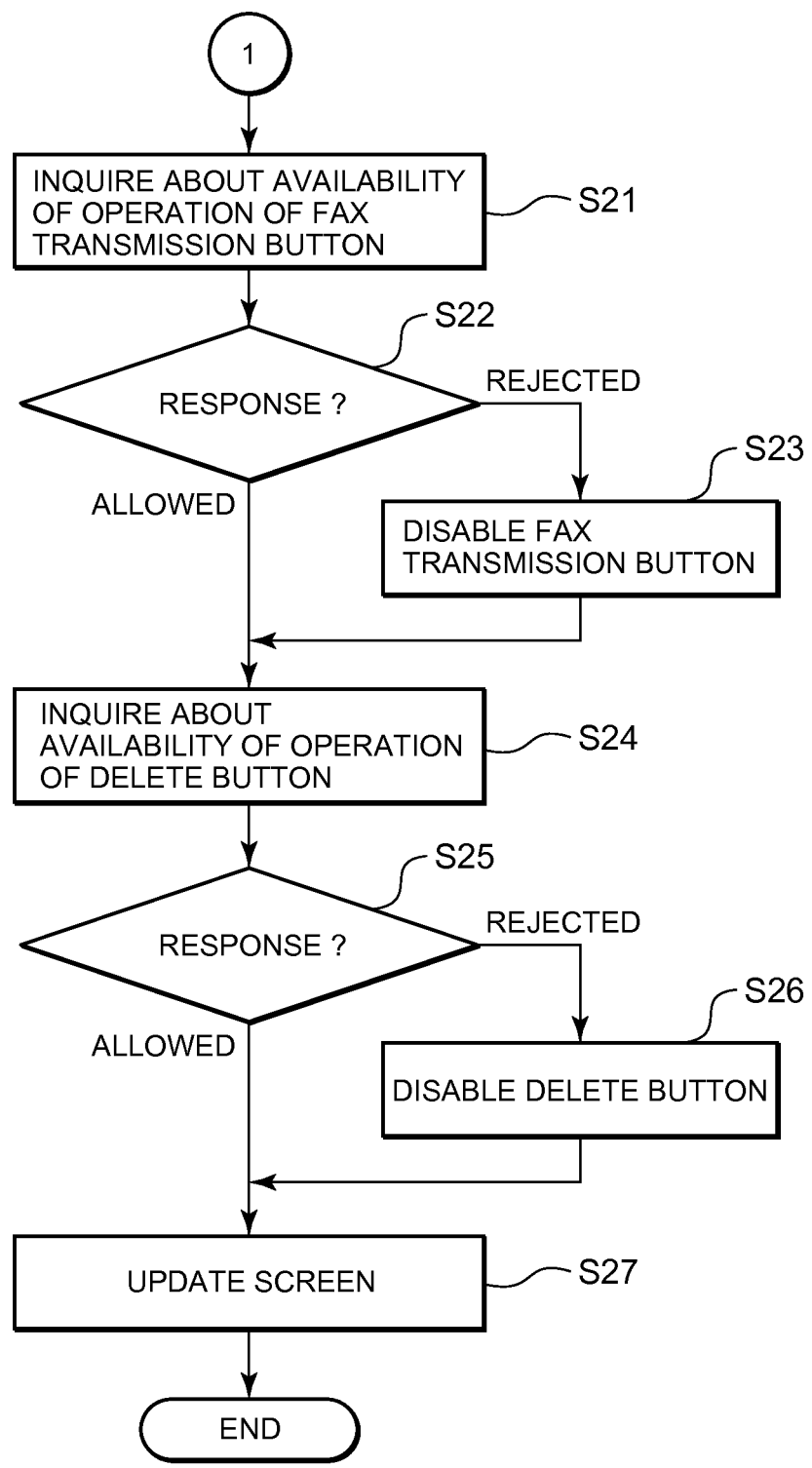
FIG. 14 is a second flow chart of the operation panel control section of the first embodiment.

Next, the operation of the operation panel control section 15 will be described with reference to FIGS. 13 and 14. FIGS. 13 and 14 are respectively first and second flowcharts of the operation panel control section 15. Here, the description will be provided about the case where the user selects "File 005__200807011205" on the file selection screen shown in FIG. 5 and a predetermined process is to be performed thereon.

At S11, the operation panel control section 15 receives instructions from the user. The operation panel control section 15 is capable of determining the content of the instruction by identifying the panel position that the user touches and by identifying the type of the button assigned to the position. Here, it is assumed that the user touches the file selection button 200 on the function selection screen shown in FIG. 4.

At S12, the operation panel control section 15 generates display data corresponding to the instruction from the user. Specifically, when the user touches the file selection button 200 on the function selection screen, the operation panel control section 15 generates display data for displaying the file selection screen shown in FIG. 5. When the user touches the "File 005__200807011205" in the list 21 to select it, the operation panel control section 15 generates display data for highlighting the "File 005__200807011205". At this time, all the buttons on the file selection screen are displayed in a state where the user can operate them.

At S13, the operation panel control section 15 acquires the image data 11a from the data storage section 11. Here, the operation panel control section 15 acquires the image data 11a of the "File 005__200807011205".

At S14, the operation panel control section 15 acquires the attribute data 11b corresponding to the image data 11a acquired at S13 from the data storage section 11.

At S15, the operation panel control section 15 inquires to the comparison section 14 about whether or not the operation of the print button 210 is allowed. In inquiring to the comparison section 14, the operation panel control section 15 sends the attribute data 11b acquired at S14 to the comparison section 14 and also notifies the comparison section 14 that this inquiry relates to the printing process.

At S16, the operation panel control section 15 receives a response to the inquiry from the comparison section 14 and determines whether the response shows "allowed" or "rejected". If the response shows "allowed," the process proceeds to S18. On the other hand, the response shows "rejected," the process proceeds to S17.

At S17, the operation panel control section 15 alters the display data generated at S12 so the user cannot operate the print button 210. In the first embodiment, the print button 210 is grayed out so that the printing process is not performed even if the user touches the print button 210.

At S18, the operation panel control section 15 inquires to the comparison section 14 about whether or not the operation of the e-mail transmission button 211 is allowed. In inquiring to the comparison section 14, the operation panel control section 15 sends the attribute data 11b acquired at S14 to the comparison section 14 and also notifies the comparison section 14 that this inquiry relates to the e-mail transmission process.

At S19, the operation panel control section 15 receives a response to the inquiry from the comparison section 14 and determines whether the response shows "allowed" or "rejected." If the response shows "allowed," the process proceeds to S21. On the other hand, the response shows "rejected," the process proceeds to S20.

At S20, the operation panel control section 15 alters the display data generated at S12 so the user cannot operate the e-mail transmission button 211. In the first embodiment, the e-mail transmission button 211 is grayed out so that the e-mail transmission process is not performed even if the user touches the e-mail transmission button 211.

At S21, the operation panel control section 15 inquires to the comparison section 14 about whether or not the operation of the FAX transmission button 212 is allowed. In inquiring to the comparison section 14, the operation panel control section 15 sends the attribute data 11b acquired at S14 to the comparison section 14 and also notifies the comparison section 14 that this inquiry relates to the FAX transmission process.

At S22, the operation panel control section 15 receives a response to the inquiry from the comparison section 14 and determines whether the response shows "allowed" or "rejected." If the response shows "allowed," the process proceeds to S24. On the other hand, the response shows "rejected," the process proceeds to S23.

At S23, the operation panel control section 15 alters the display data generated at S12 so the user cannot operate the FAX transmission button 212. In the first embodiment, the FAX transmission button 212 is grayed out so that the FAX transmission process is not performed even if the user touches the FAX transmission button 212.

At S24, the operation panel control section 15 inquires to the comparison section 14 about whether or not the operation of the delete button 213 is allowed. In inquiring to the comparison section 14, the operation panel control section 15 sends the attribute data 11b acquired at S14 to the comparison section 14 and also notifies the comparison section 14 that this inquiry relates to the delete process.

At S25, the operation panel control section 15 receives a response to the inquiry from the comparison section 14 and determines whether the response shows "allowed" or "rejected." If the response shows "allowed," the process proceeds to S27. On the other hand, the response shows "rejected," the process proceeds to S26.

At S26, the operation panel control section 15 alters the display data generated at S12 so the user cannot operate the delete button 213. In the first embodiment, the delete button 213 is grayed out so that the delete process is not performed even if the user touches the delete button 213.

At S27, the operation panel control section 15 updates the screen displayed on the operation panel 12 on the basis of the display data on which all the above mentioned alterations are reflected.

Although the above description was given about the case where the user selects the file on the file selection screen shown in FIG. 5, the operation panel control section 15 may operate in the same way as the operation in FIGS. 13 and 14 in other cases. That is, the operation panel control section 15 acquires the image data 11a and the attribute data 11b from the data storage section 11, and inquires to the comparison section 14 about whether or not the operation of each button is allowed.

Figure 15:
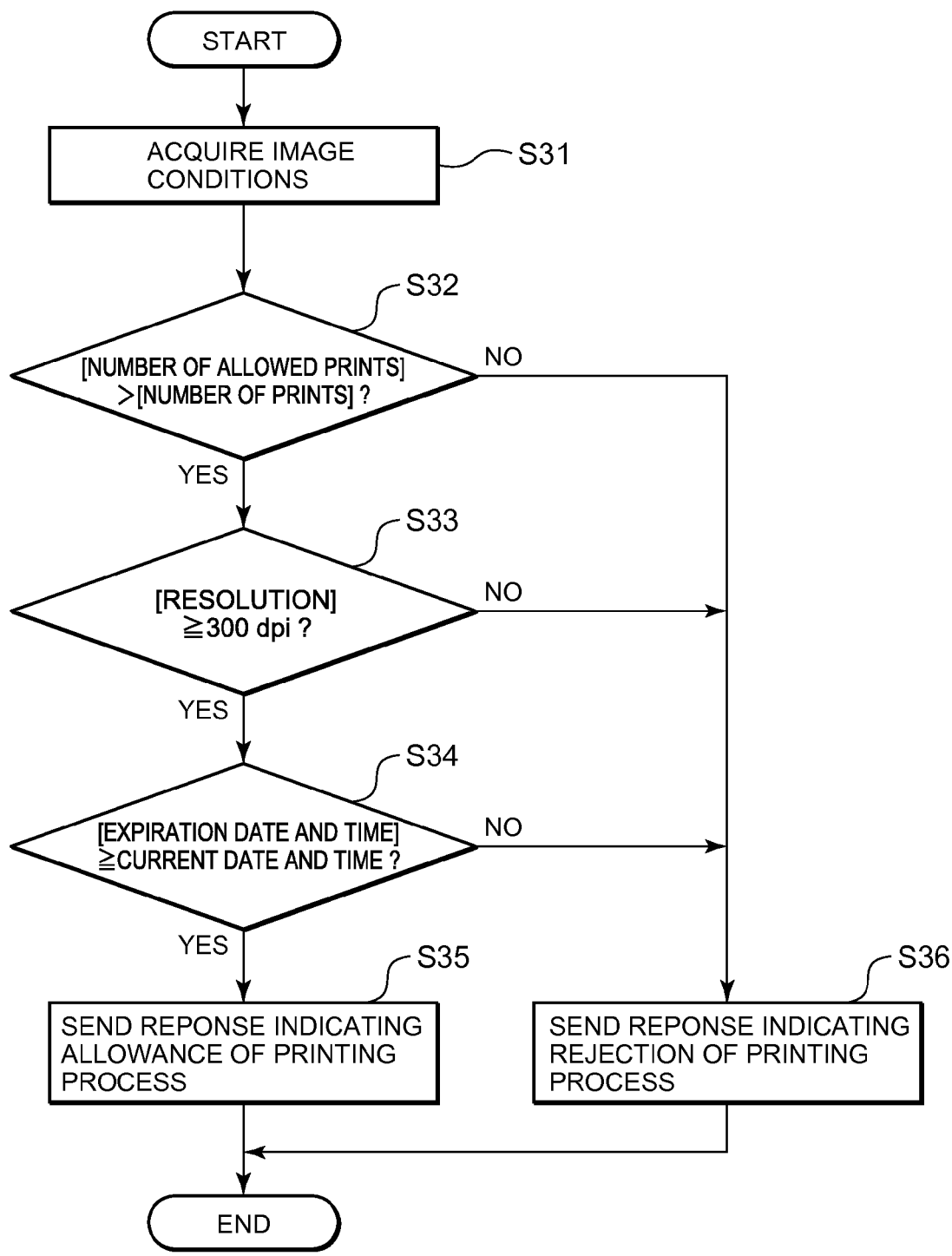
FIG. 15 is a flow chart of a comparison section of the first embodiment.

Next, the operation of the comparison section 14 will be described with reference to FIG. 15. FIG. 15 is a flow chart of the comparison section 14, which illustrates the case where the comparison section 14 receives the inquiries from the operation panel control section 15.

Here, the description will be provided about the case where the comparison section 14 receives the inquiry regarding the printing process from the operation panel control section 15 at S15 shown in FIG. 13. Moreover, it is assumed that the attribute data 11b corresponding to the "File 005_200807011205," which is the image data 11a, has been set as shown in FIG. 3 and the image condition data 13a has been defined as shown in FIG. 11.

At S31, the comparison section 14 acquires the image conditions for the printing process from the image condition data 13a stored in the image condition data storage section 13. Specifically, the comparison section 14 acquires the following three image conditions from the image condition data 13a.

(1) [NUMBER OF ALLOWED PRINTS]>[NUMBER OF PRINTS]

(2) [RESOLUTION]≧300 dpi (3) [EXPIRATION DATE AND TIME]≧Current date and time

At S32, the comparison section 14 compares the value of the "NUMBER OF ALLOWED PRINTS" with the value of the "NUMBER OF PRINTS," in the attribute data 11b received from the operation panel control section 15. If the value of the "NUMBER OF ALLOWED PRINTS" is greater than the value of the "NUMBER OF PRINTS," the process proceeds to S33. Otherwise, the process proceeds to S36.

At S33, the comparison section 14 compares the value of the "RESOLUTION," which is included in the attribute data 11b received from the operation panel control section 15, with 300 (dpi). If the value of the "RESOLUTION" is larger than or equal to 300 (dpi), the process proceeds to S34. Otherwise, the process proceeds to S36.

At S34, the comparison section 14 compares the "EXPIRATION DATE AND TIME," which is included in the attribute data 11b received from the operation panel control section 15, with the current date and time. If the current date and time is not beyond the "EXPIRATION DATE AND TIME," the process proceeds to S35. Otherwise, the process proceeds to S36.

At S35, the comparison section 14 sends a response to the operation panel control section 15, which shows that the printing process should be allowed.

At S365, the comparison section 14 sends a response to the operation panel control section 15, which shows that the printing process should be rejected.

Although the above description was given about the case where the comparison section 14 receives the inquiry regarding the printing process from the operation panel control section 15, the comparison section 14 may operate in the same way as the operation in FIG. 15 in other cases. That is, the comparison section 14 acquires the image conditions for a predetermined process from the image condition data 13a stored in the image condition data storage section 13, and determines whether or not the attribute data 11b satisfies each of the image conditions. The comparison section 14 sends the "allowed" response to the operation panel control section 15 only when the attribute data 11b satisfies all of the image conditions. Otherwise, the comparison section 14 sends the "rejected" response to the operation panel control section 15.

Next, the restrictions on the processes to the image data 11a will be described. Here, for example, the user selects desired image data 11a from the list 21 on the file selection screen shown in FIG. 5 to print the image data 11a. Moreover, it is assumed that the image condition data 13a has been defined as shown in FIG. 11 and the attribute data 11b corresponding to the image data 11a has been set as shown in FIG. 3. Furthermore, it is assumed that the "EXPIRATION DATE AND TIME" in the attribute data 11b is later than the current date and time.

The image conditions for the printing process to the image data 11a has been set as follows:
 (1) [NUMBER OF ALLOWED PRINTS]>[NUMBER OF PRINTS];
 (2) [RESOLUTION]≧300 dpi; and
 (3) [EXPIRATION DATE AND TIME]≧Current date and time.

Referring to FIG. 3, since the resolution of the image data 11a is 150 dpi, the image data 11a does not satisfy the image conditions for the printing process.

The image condition for the e-mail transmission process to the image data 11a has been set as follows:
 (1) [EXPIRATION DATE AND TIME]≧Current date and time.

As described above, since the "EXPIRATION DATE AND TIME" in the attribute data 11b is later than the current date and time, the image data 11a satisfies the image conditions for the e-mail transmission process.

The image conditions for the FAX transmission process to the image data 11a has been set as follows:
 (1) [NUMBER OF ALLOWED FAX TRANSMISSIONS]>[NUMBER OF FAX TRANSMISSIONS]; and
 (2) [EXPIRATION DATE AND TIME]≧Current date and time.

Referring to FIG. 3, the "NUMBER OF ALLOWED FAX TRANSMISSIONS" and the "NUMBER OF FAX TRANSMISSIONS" in the attribute data 11b are respectively "1" and "0." In addition, as described above, the "EXPIRATION DATE AND TIME" in the attribute data 11b is later than the current date and time. Therefore, the image data 11a satisfies the image conditions for the FAX transmission process.

In such a case, the user cannot operate the print button 210 on the file selection screen displayed on the operation panel shown in FIG. 5.

Figure 16:
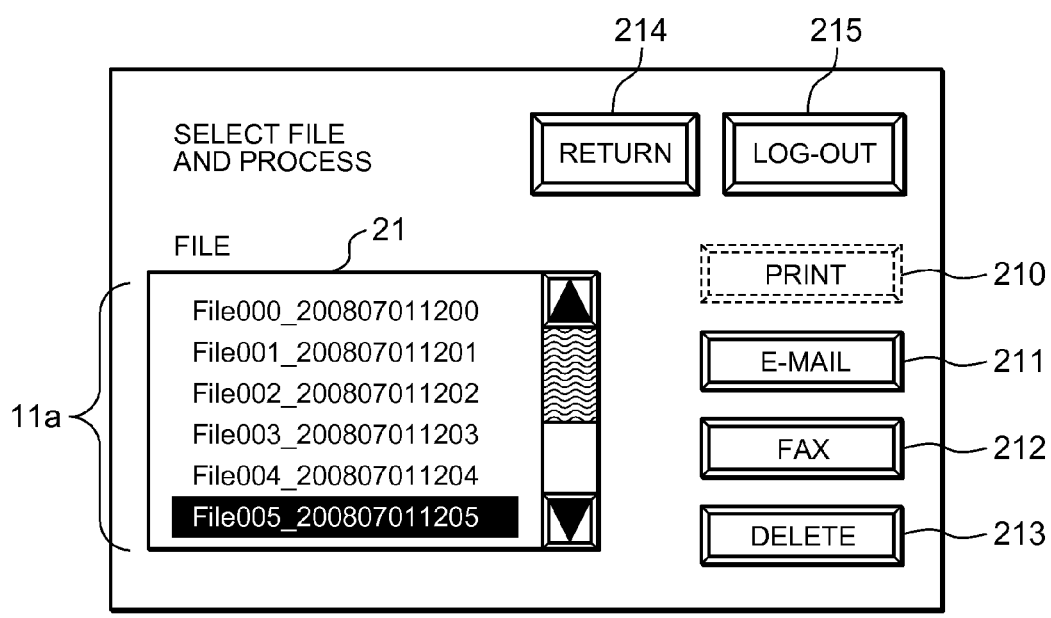
FIG. 16 is a screen view of the file selection screen displayed on the operation panel when a printing process to the image data is restricted.

The restrictions on the processes to the image data 11a will be described in more detail with reference to FIG. 16. FIG. 16 is a screen view of the file selection screen displayed on the operation panel 12 when the printing process to the image data 11a is restricted.

For example, it is assumed that the user selects "File 005_200807011205" on the file selection screen shown in FIG. 5 and the attribute data 11b corresponding to the "File 005_200807011205" has been set as shown in FIG. 3. The operation panel control section 15 starts the operation shown in FIGS. 13 and 14 upon receiving the instructions to select the "File 005_200807011205" from the user.

As described above, the operation panel control section 15 inquires to the comparison section 14 about whether or not the operation of the print button 210 is allowed, at S15 to S16. The comparison section 14 determines whether or not the values of the attribute data 11b satisfy each of the image conditions for the printing process, which are defined in image condition data 13a. Since the resolution of the "File 005_200807011205" is 150 dpi, the image data 11a does not satisfy the image conditions for the printing process. Therefore, the comparison section 14 sends a response to the operation panel control section 15, which shows that the operation of the print button 210 should be rejected. The comparison section 14 also sends responses to the operation panel control section 15, which shows that the operations of the other buttons such as the e-mail transmission button 211 and the FAX transmission button 212 should be allowed. The operation panel control section 15 alters the display data on the basis of the responses to update the screen displayed on the operation panel 12. As a result, as shown in FIG. 16, the print button 210 on the file selection screen is displayed in a state where the user cannot select it.

In the first embodiment, when the attribute data 11b does not satisfy the image conditions for a predetermined process, the button for the process is displayed on the operation panel 12 in a state where the user cannot operate it, for example, the button for the process is grayed out. However the button for the process may not be displayed on the operation panel 12. Moreover, while the button for the process is displayed in a state where the user can operate it, an error notification may be provided to the user when the user touches it. At this time, the reason for the error may be displayed on the operation panel 12.

Figure 17:
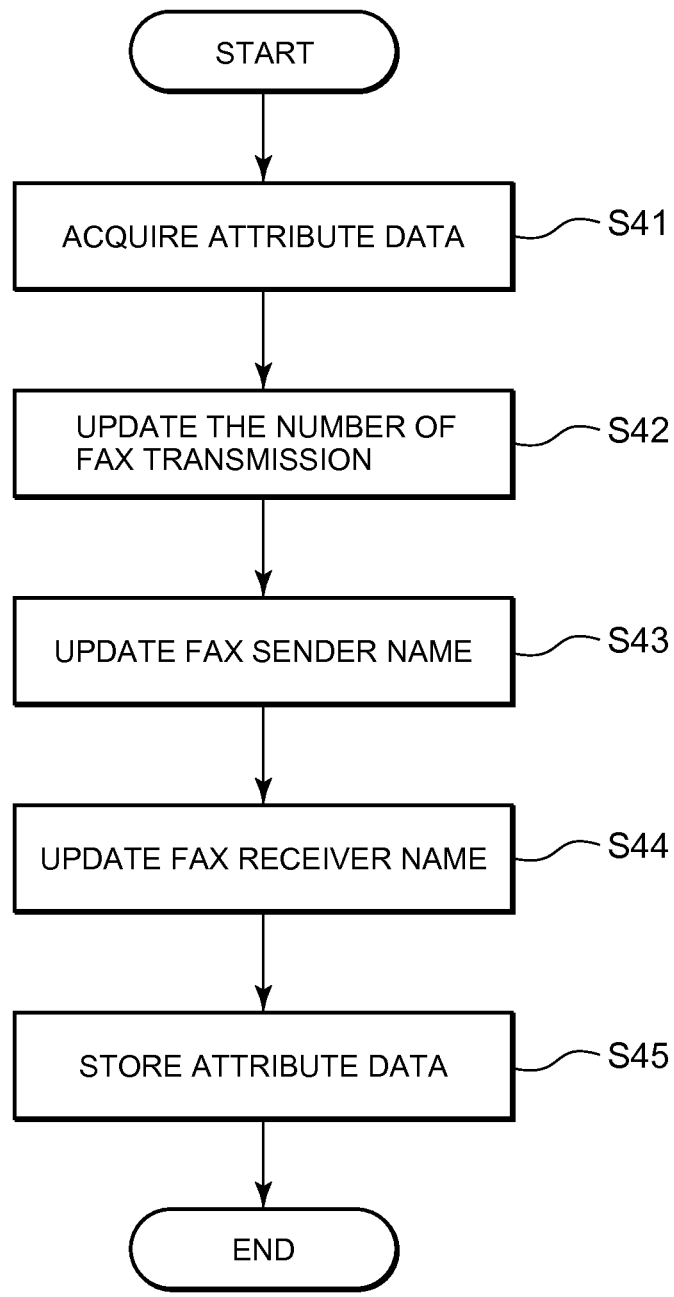
FIG. 17 is a flow chart of the operation for updating the attribute data of the first embodiment.

Next, the operation for updating the attribute data 11b of the MFP 10 will be described with reference to FIG. 17. FIG. 17 is a flow chart of the operation for updating the attribute data 11b. Here, the description will be provided about the case where a FAX transmission control section, not shown, updates the attribute data 11b for the image data 11a after faxing the image data 11a. The operation below is performed by the FAX transmission control section.

At S41, the FAX transmission control section acquires the attribute data 11b corresponding to the image data 11a from the data storage section 11.

At S42, the FAX transmission control section updates the value of the "NUMBER OF FAX TRANSMISSIONS" in the attribute data 11b shown in FIG. 3. Specifically, the value of the "NUMBER OF FAX TRANSMISSIONS" is incremented by one for every FAX transmission.

At S43, the FAX transmission control section updates the information on the "FAX SENDER NAME." The information on the "FAX SENDER NAME" can be acquired from login information on the user who logged into the MFP 10.

At S44, the FAX transmission control section updates the information on the "FAX RECEIVER NAME." The information on the "FAX RECEIVER NAME" can be acquired from the phone number the user inputs for the FAX transmission or the information on the receiver, which is received from the destination FAX machine.

At S45, the FAX transmission control section stores the attribute data 11b that is updated at S42 to S44 in the data storage section 11.

Through the above mentioned procedures, the attribute data 11b is updated. Although the above description was given about the case where the attribute data 11b is updated after faxing the image data 11a, the attribute data 11b may be updated in the same way as the operation in FIG. 17 in other cases.

As described above, in the first embodiment, the MFP 10 restricts the execution of processes on the image data 11a when the attribute of the image data 11a does not satisfy the image conditions a user needs, thereby preventing undesirable processing results from outputting.

Second Embodiment

Figure 18:
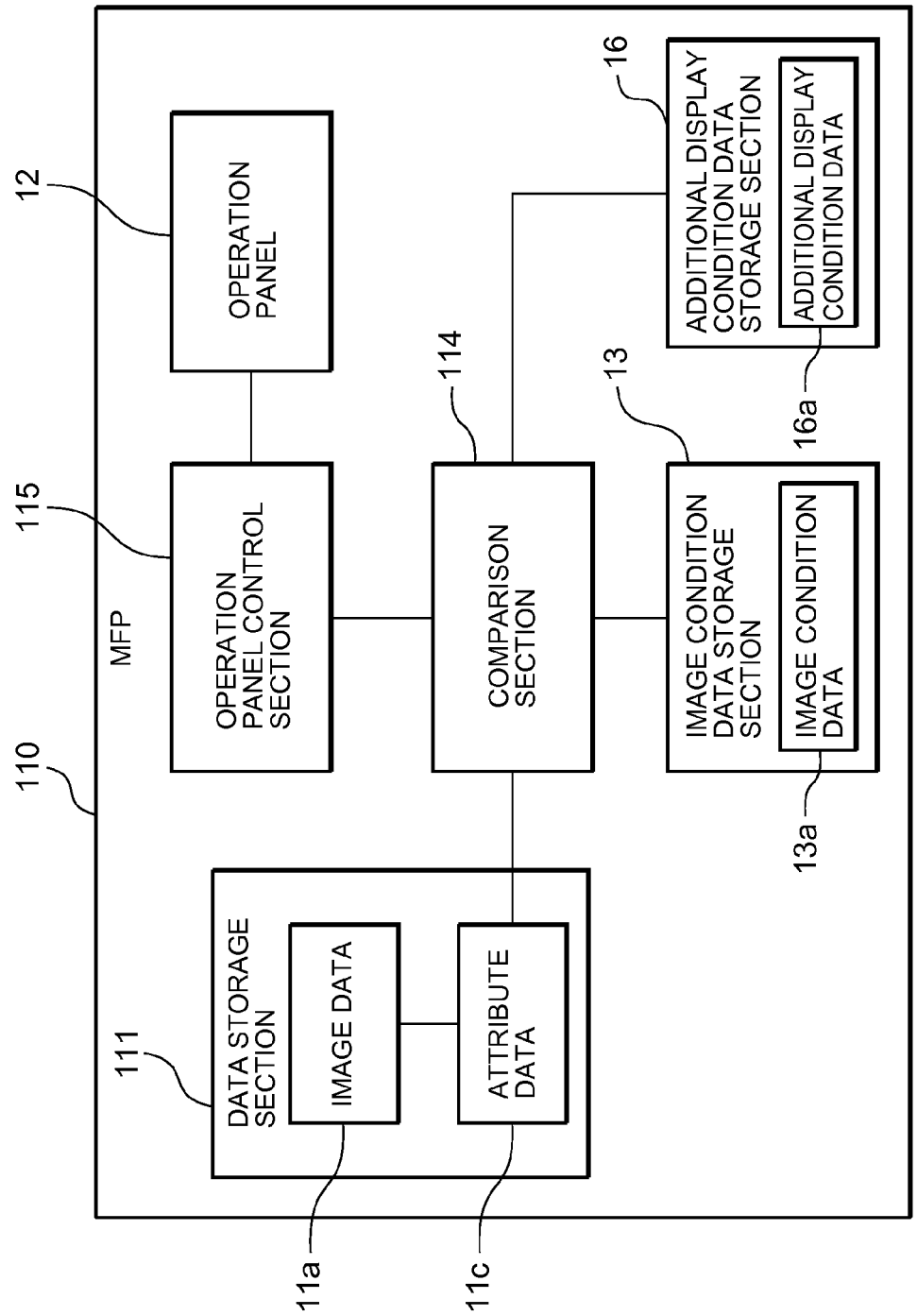
FIG. 18 is a block diagram of an MFP of a second embodiment.

FIG. 18 is a block diagram of an MFP 110 according to a second embodiment. In the MFP 110, the data storage section 11, the attribute data 11b, the operation panel control section 15 and the comparison section 14 of the MFP 10 are respectively replaced with a data storage section 111, attribute data 11c, an operation panel control section 115 and a comparison section 114. In addition, an additional display condition data storage section 16, or an additional display condition information storage section, is added to the MFP 110. The additional display condition data storage section 16 stores additional display condition data 16a, or additional display condition information, and is connected to the comparison section 114. The other elements are the same as those in the first embodiment. Therefore, elements similar to those in the first embodiment have been given the same numerals and their description is omitted.

FIG. 19 is a data structure diagram of the attribute data 11c, which includes new attribute items, i.e. "PRESENCE OF AUTHENTICATION INFORMATION" and "AUTHENTICATION INFORMATION," in addition to all the attribute items included in the attribute data 11b. The information "YES" and "1234" are respectively defined for the "PRESENCE OF AUTHENTICATION INFORMATION" item and the "AUTHENTICATION INFORMATION" item. The information on "AUTHENTICATION INFORMATION" item may be acquired when the user inputs the information in the apparatus that generates the image data 111, such as the host and the MFP 110.

Figure 20:
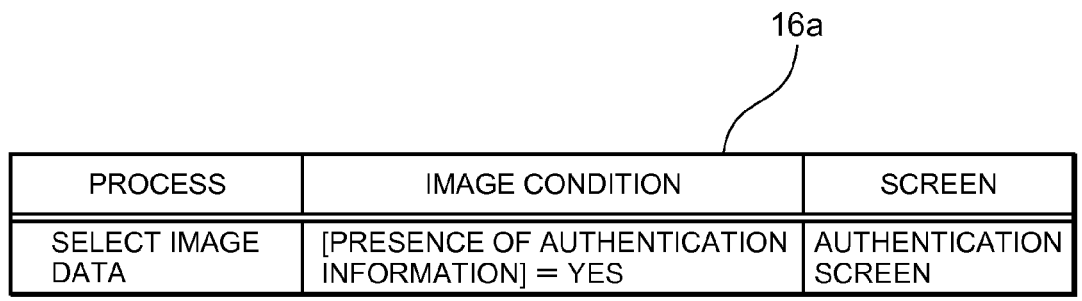
FIG. 20 is a data structure diagram of additional display condition data of the second embodiment.

FIG. 20 is a data structure diagram of the additional display condition data 16a, which includes information on processes (process information), information on image conditions (image condition information) and information on screens (screen information). The process information defines types of processes that are performed on the image data 111 on the basis of the user's instructions. The image condition information defines image conditions corresponding to the image data 111. The screen information defines types of screens that are additionally displayed on the operation panel 12. Regarding the additional display condition data 16a shown in FIG. 20, when the user gives an instruction to select the image data 111 and the information on the "PRESENCE OF AUTHENTICATION INFORMATION" item in the attribute data 11c corresponding to the image data 111 is "YES, an authentication screen is additionally displayed."

The comparison section 114 has the same functions as the comparison section 14 in the first embodiment. Additionally the comparison section 114 has a function of determining whether or not an additional screen is present, based on the type of process that is to be performed on the image data 111, the additional display condition data 16a stored in the additional display condition data storage section 16 and the attribute data 11c corresponding to the image data 111.

The comparison section 114 starts its operation upon receiving the attribute data 11c of the image data 11a that is to be processed and a user's instruction relating to the process from the operation panel control section 115. First, the comparison section 114 acquires the additional display condition data 16a from the additional display condition data storage section 16. Next, the comparison section 114 specifies the additional display condition data 16a corresponding to the process instructed by the user. Subsequently, the comparison section 114 compares the additional display condition data 16a with the attribute data 11c of the image data 111 to determine whether or not the additional screen is present. The comparison section 14a sends the comparison results to the operation panel control section 115.

Next, the operation of the MFP 110 will be described.

Figure 21:
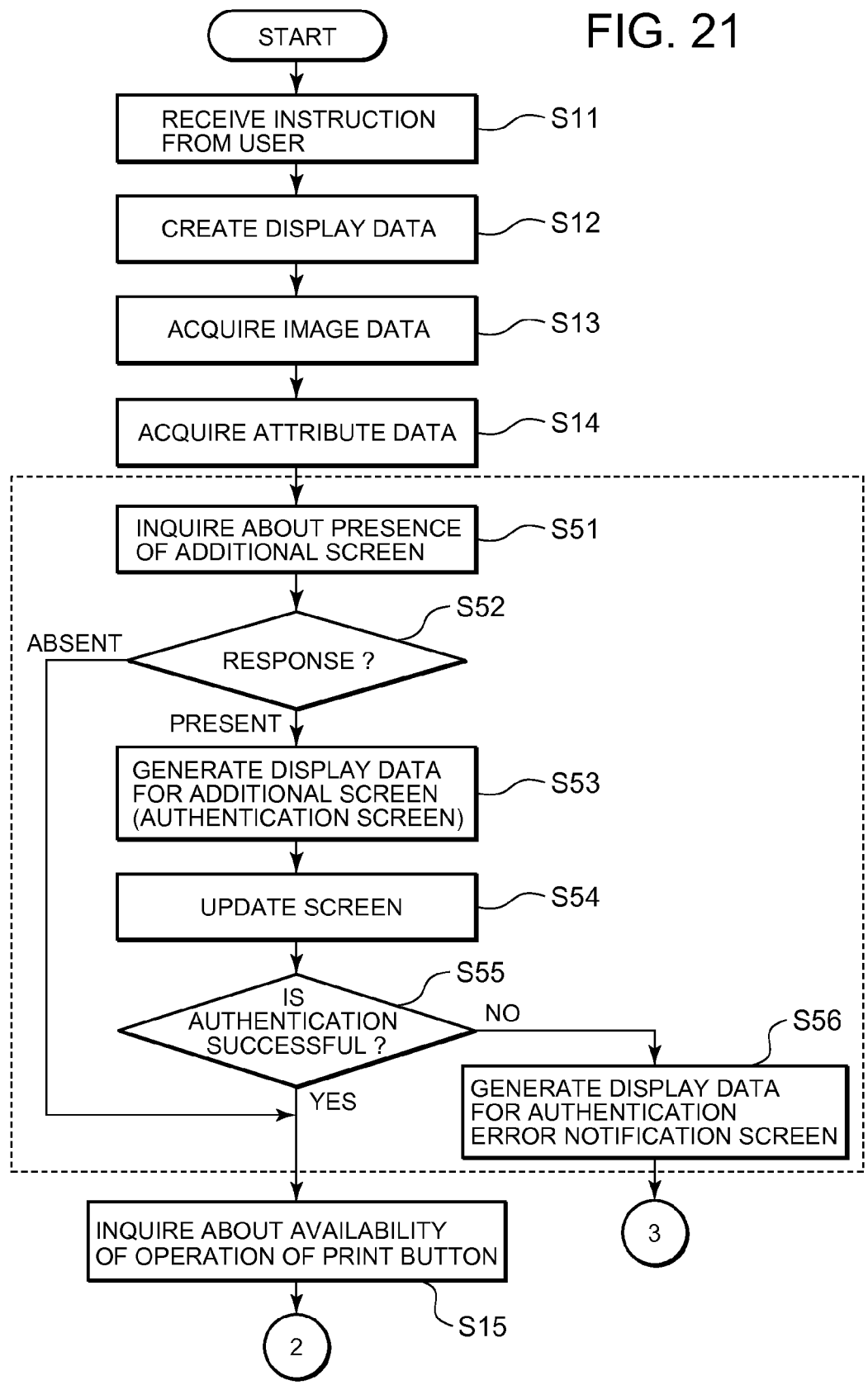
FIG. 21 is a first flow chart of an operation panel control section of the second embodiment.
Figure 22:
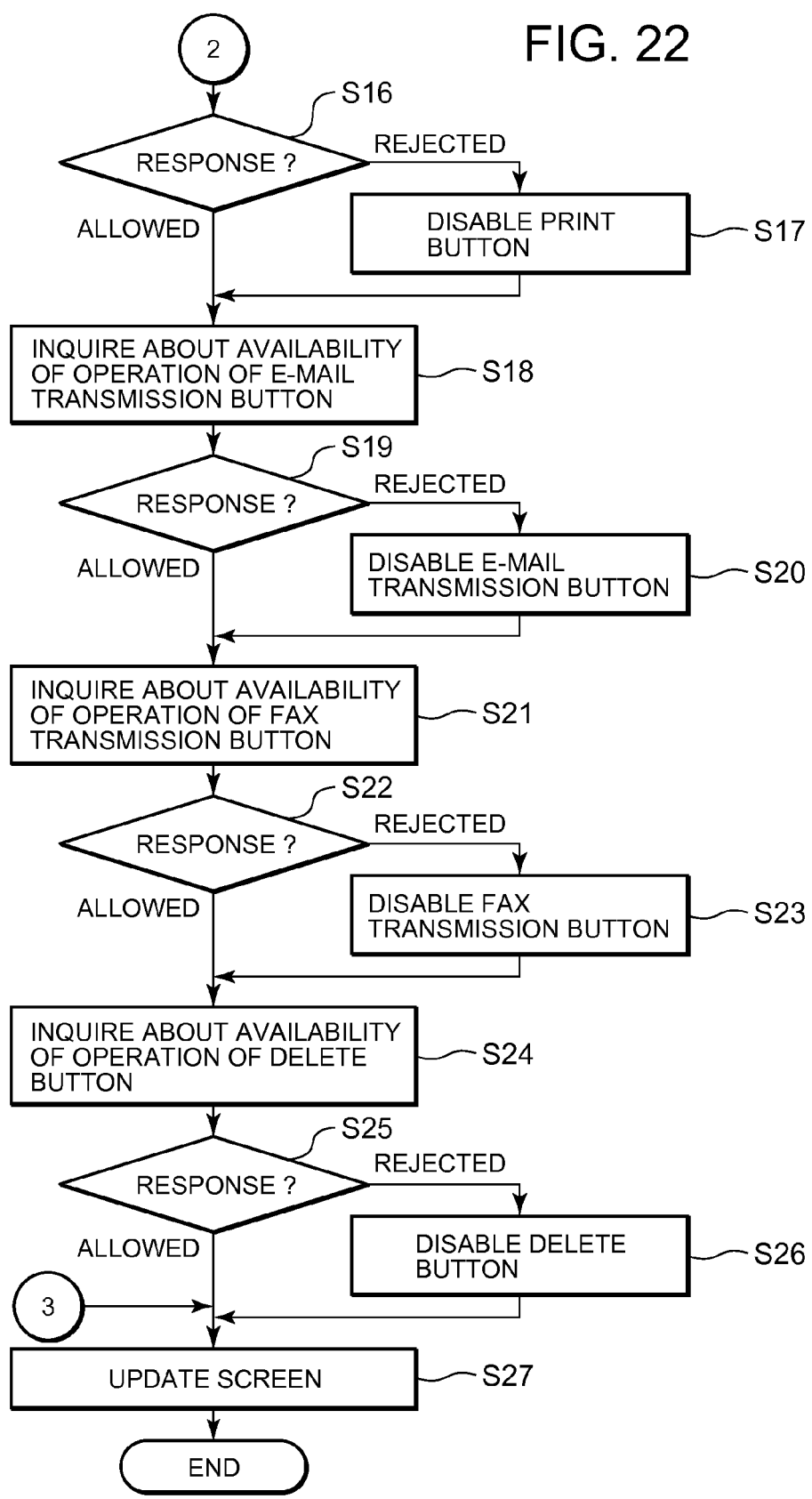
FIG. 22 is a second flow chart of the operation panel control section of the second embodiment.
Figure 23:
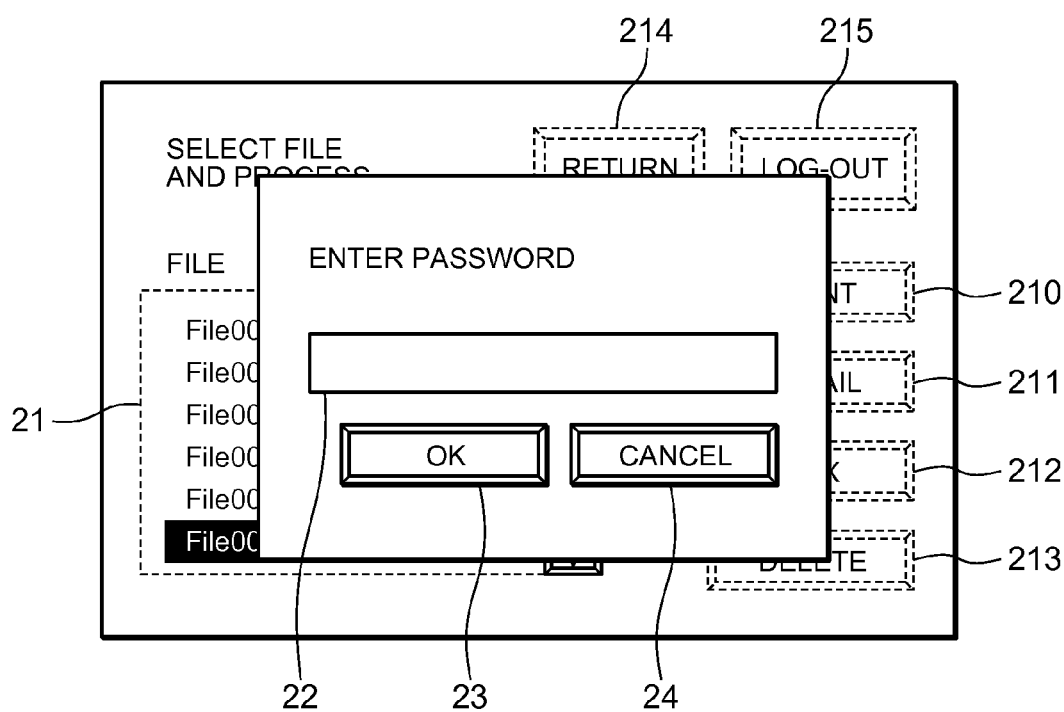
FIG. 23 is a screen view of an authentication screen of the second embodiment.
Figure 24:
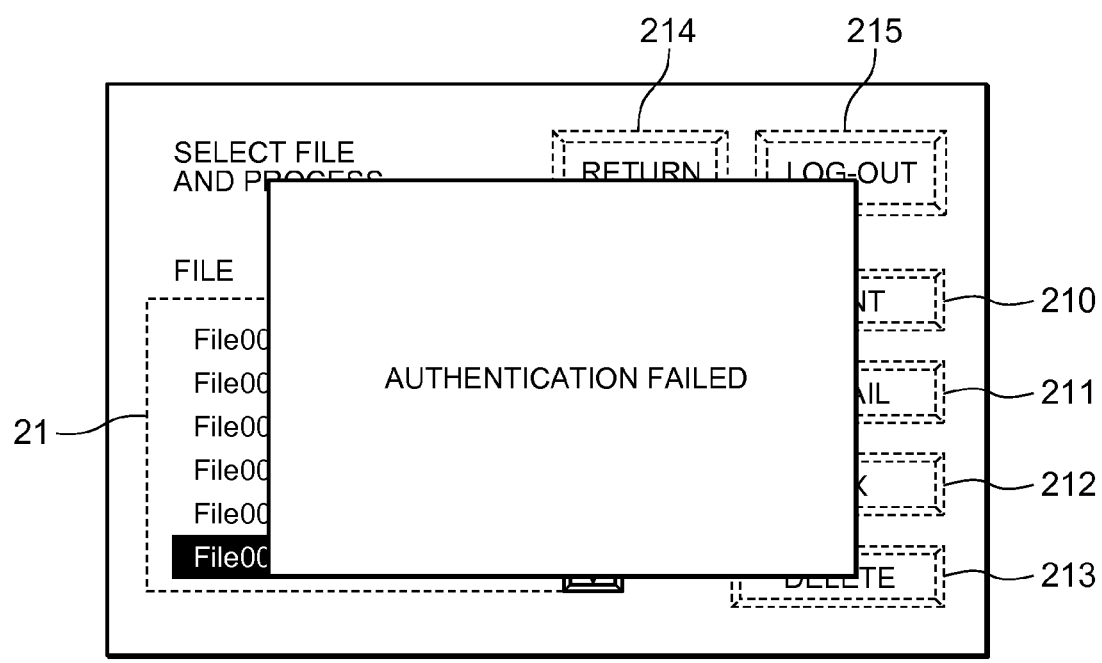
FIG. 24 is a screen view of an authentication error notification screen of the second embodiment.

First, the operation of the operation panel control section 115 will be described with reference to FIGS. 21 and 22. FIGS. 21 and 22 are respectively a first and second flow chart of the operation panel control section 115, in which the same processes as those in FIGS. 13 and 14 have been given the same numerals. FIGS. 23 and 24 are respectively screen views of an authentication screen and an authentication error notification screen. The authentication screen and the authentication error notification screen are additionally displayed on the operation panel 12.

In the first flow chart of FIG. 21, new processes S51 to S56 enclosed in dashed lines are added between processes S14 and S15 in the flow chart of FIG. 13 in the first embodiment. Therefore, the description of the same processes as those in FIGS. 13 and 14 will be omitted and the description of the new processes S51 to S56 will be provided. Here, the description will be provided about the case where the user selects "File005__200807011205" on the file selection screen shown in FIG. 5.

At S51, the operation panel control section 115 inquires to the comparison section 114 about whether or not the additional screen is present. In inquiring to the comparison section 114, the operation panel control section 115 sends the attribute data 11c acquired at S14 to the comparison section 114 and also notifies the comparison section 114 that this inquiry relates to the selection of the image data 111.

At S52, the operation panel control section 115 receives a response to the inquiry from the comparison section 114 and determines whether the response shows "PRESENT" or "ABSENT." If the response shows "PRESENT," the process proceeds to S53. On the other hand, the response shows "ABSENT," the process proceeds to S15.

At S53, the operation panel control section 115 generates a display data for displaying the additional screen. Here, the operation panel control section 115 generates a display data for displaying the authentication screen for authenticating the user.

At S54, the operation panel control section 115 updates the screen displayed on the operation panel 12 on the basis of the display data generated at S53.

Referring to FIG. 23, the authentication screen displays a text box 22 in which the user inputs the authentication information, an OK button 23 and a cancel button 24 for cancelling the authentication process. At this time, all other buttons that are not related to the authentication process are displayed in a state where the user cannot operate them. When the user inputs the authentication information in the text box 22 and then touches the OK button 23, the operation panel control section 115 clears the authentication screen shown in FIG. 23 from the operation panel 12 and performs the operation of S55. When the user touches the cancel button 24, the operation panel control section 115 clears the authentication screen shown in FIG. 23 from the operation panel 12 and ends the operation shown in FIG. 21.

At S55, the operation panel control section 115 determines whether or not the authentication information input at S54 is coincident with the authentication information in the attribute data 11c. When they coincide, that is, the authentication is successful, the operation panel control section 115 performs the operation of S15. When they do not coincide, that is, the authentication is failed, the operation panel control section 115 performs the operation of S56.

At S56, the operation panel control section 115 generates a display data for displaying the authentication error notification screen that notifies the user of the failure in the authentication, as shown in FIG. 24.

Thereafter, the operation panel control section 115 updates the screen displayed on the operation panel 12 at S27.

Figure 25:
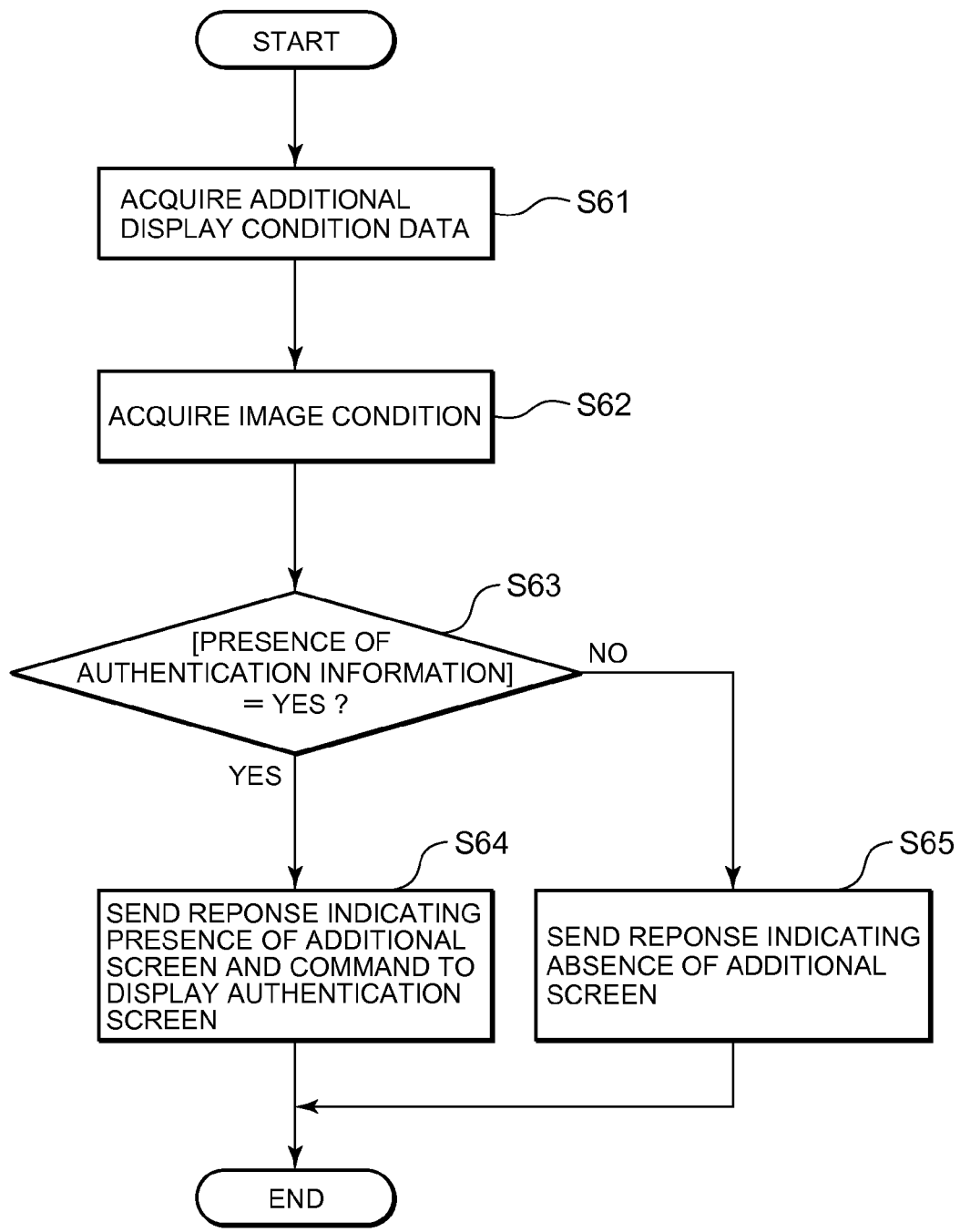
FIG. 25 is a flow chart of a comparison section of the second embodiment.

Next, the operation of the comparison section 114 will be described with reference to FIG. 25. FIG. 25 is a flow chart of the comparison section 114, which illustrates the case where the comparison section 114 receives the inquiry from the operation panel control section 115 about whether or not the additional screen is present.

Here, the description will be provided about the case where the comparison section 114 receives the inquiry from the operation panel control section 115 at S51 shown in FIG. 21.

At S61, the comparison section 114 acquires the additional display condition data 16*a* stored in the additional display condition data storage section 16.

At S62, the comparison section 114 acquires the image condition corresponding to the process instructed by the user, namely the selection process to the image data 111, from the additional display condition data 16*a* acquired at S61.

At S63, the comparison section 114 determines whether or not the information on the "PRESENCE OF AUTHENTICATION INFORMATION" item in the attribute data 11*c* is "YES," in accordance with the image condition acquired at S62. If the information on the "PRESENCE OF AUTHENTICATION INFORMATION" item is "YES," the comparison section 114 performs the operation of S64. If the information on the "PRESENCE OF AUTHENTICATION INFORMATION" item is "NO," the comparison section 114 performs the operation of S65.

At S64, the comparison section 114 sends a response to the operation panel control section 115, which shows that the additional screen is present. At this time, the comparison section 114 commands the operation panel control section 115 to display additionally the authentication screen on the operation panel 12.

At S65, the comparison section 114 sends a response to the operation panel control section 115, which shows that the additional screen is absent.

Through the above mentioned procedures, the comparison section 114 responds to the inquiries received from the operation panel control section 115.

As described above, in the second embodiment, the MFP 110 displays an additional screen, for example, an authentication screen, on the operation panel 12 when the image data 111 satisfies predetermined image conditions, thereby protecting the confidentiality of the image data 111.

While the first and second embodiments have been described with respect to the examples where the invention is implemented on an MFP as an image forming apparatus, the invention may be implemented on a printer driver in an image processing apparatus. In this case, upon receiving a command to perform a printing process from the application AP, the printer driver acquires print data in advance from the application AP and generates the attribute data 11*b* (11*c*) from the print data. Then, the printer driver compares image conditions that have been set on the printer driver in advance with the attribute data 11*b* (11*c*) and changes the state of setting buttons or setting items on the print instruction screen of the print driver.

While the first and second embodiments have been described with respect to an MFP as an image forming apparatus, the invention may be applied to any other image forming apparatus, such as a copier, a printer, a scanner or a facsimile machine, which is capable of storing image data temporarily.

The image processing apparatus and the method for performing an operation for image information being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An image processing apparatus, comprising:
   a storage medium that stores image information and attribute information that indicates an attribute of the image information;
   an operation section by which a user selects the image information and that is configured to perform an operation for the selected image information;
   a determination section configured to determine a display item to be displayed by the operation section based on the attribute information that corresponds to the selected image information, the display item indicating a function executable for the image information; and
   an operation control section configured to change a display effect of the displayed item to be displayed by the operation section based on a determination result by the determination section.

2. The image processing apparatus according to claim 1, wherein
   the determination section includes image condition information that is a display condition for the operation, and
   the determination section determines the display item by comparing the attribute information and the image condition information.

3. The image processing apparatus according to claim 2, wherein
   the image condition information differs by each user.

4. The image processing apparatus according to claim 2, wherein
   the image condition information is changeable by the user.

5. The image processing apparatus according to claim 2, wherein
   a plurality of display conditions are set to the image condition information for a predetermined operation.

6. The image processing apparatus according to claim 1, wherein
   the operation control section does not display a predetermined item by the operation section based on the determination result.

7. The image processing apparatus according to claim 1, wherein
   the attribute information is created when the image information is created.

8. The image processing apparatus according to claim 1, wherein
   the attribute information is created when the image information is received.

9. The image processing apparatus according to claim 1, wherein
   the operation control section creates an additional screen and displays a positive selection image and a negative selection image in response to the attribute information that corresponds to the selected image information, and
   when the positive selection image is selected, the operation control section changes the displayed item to be displayed by the operation section based on the determination result by the determination section.

10. A method for performing an operation for image information, comprising:

displaying a plurality of sets of image information stored in a storage medium so as to allow a user to select predetermined image information;

determining a display item to be displayed, based on attribute information stored in the storage medium that corresponds to the selected image information, the display item indicating a function executable for the image information, the attribute information indicating an attribute of the image information; and changing a display effect of the displayed item to be displayed, based on a determination result.

11. The method according to claim 10, wherein
the determination is a comparison of the attribute information and image condition information that is a display condition for the operation.

12. The method according to claim 11, wherein
the image condition information differs by each user.

13. The method according to claim 11, wherein
the image condition information is changeable by the user.

14. The method according to claim 11, wherein
a plurality of display conditions are set to the image condition information for a predetermined operation.

15. The method according to claim 10, wherein
not displaying a predetermined item by the operation section based on the determination result.

16. The method according to claim 10, wherein
the attribute information is created when the image information is created.

17. The method according to claim 10, wherein
the attribute information is created when the image information is received.

18. The method according to claim 10, wherein
the changing step includes creating an additional screen and displaying a positive selection image and a negative selection image in response to the attribute information that corresponds to the selected image information, and when the positive selection image is selected, changing the displayed item to be displayed, based on the determination result by the determination section.

19. The image processing apparatus according to claim 1, wherein
the operation control section is configured to change the display effect of the displayed item by graying out a display of the displayed item.

20. The method according to claim 10, wherein
changing the display effect of the displayed item is graying out a display of the displayed item.

21. The image processing apparatus according to claim 1, wherein
the operation control section is configured to change the display effect of the displayed item by not displaying a predetermined item.

22. The method according to claim 10, wherein
changing the display effect of the displayed item is not displaying a predetermined item.

23. The image processing apparatus according to claim 1, wherein
the operation control section is configured to change the display effect of the displayed item by displaying an error notification when a predetermined displayed item is pressed.

24. The method according to claim 10, wherein
changing the display effect of the displayed item is displaying an error notification when a predetermined displayed item is pressed.

25. The image processing apparatus according to claim 7, wherein the attribute information is created by a device that creates the image information.

26. The method of claim 16, wherein
the attribute information is created by a device that creates the image information.

27. The image processing apparatus according to claim 7, wherein
the attribute information is created by a device from which the image information is received.

28. The method of claim 16, wherein
the attribute information is created by a device from which the image information is received.

* * * * *